United States Patent [19]
Greenbaum et al.

[11] Patent Number: 5,933,642
[45] Date of Patent: Aug. 3, 1999

[54] COMPILING SYSTEM AND METHOD FOR RECONFIGURABLE COMPUTING

[75] Inventors: Jack E. Greenbaum, Saratoga; Michael A. Baxter, Sunnyvale, both of Calif.

[73] Assignees: Ricoh Corporation, West Caldwell, N.J.; Ricoh Company Ltd., Tokyo, Japan

[21] Appl. No.: 08/827,619

[22] Filed: Apr. 9, 1997

Related U.S. Application Data

[63] Continuation-in-part of application No. 08/423,560, Apr. 17, 1995, Pat. No. 5,794,062.

[51] Int. Cl.[6] .............................. G06F 15/18; G06F 19/00
[52] U.S. Cl. ................ 395/709; 395/800.01; 395/800.39
[58] Field of Search ............................... 395/709, 880.07, 395/800.39

[56] References Cited

U.S. PATENT DOCUMENTS

| | | | |
|---|---|---|---|
| 5,361,373 | 11/1994 | Gilson | 395/800.01 |
| 5,600,845 | 2/1997 | Gilson | 395/800.39 |
| 5,675,805 | 10/1997 | Boldo et al. | 395/707 |
| 5,848,273 | 12/1998 | Fontana et al. | 395/701 |

*Primary Examiner*—Emanuel Todd Voeltz
*Assistant Examiner*—John Q. Chavis
*Attorney, Agent, or Firm*—Fenwick & West LLP

[57] ABSTRACT

A compiling system and method for generating a sequence of program instructions for use in a dynamically reconfigurable processing unit having an internal hardware organization that is selectively changeable among a plurality of hardware architectures, each hardware architecture executing instructions from a corresponding instruction set. Source files are compiled for execution using various instruction set architectures as specified by reconfiguration directives. Object files optionally encapsulate bitstreams specifying hardware architectures corresponding to instruction set architectures with executable code for execution on the architectures.

32 Claims, 14 Drawing Sheets

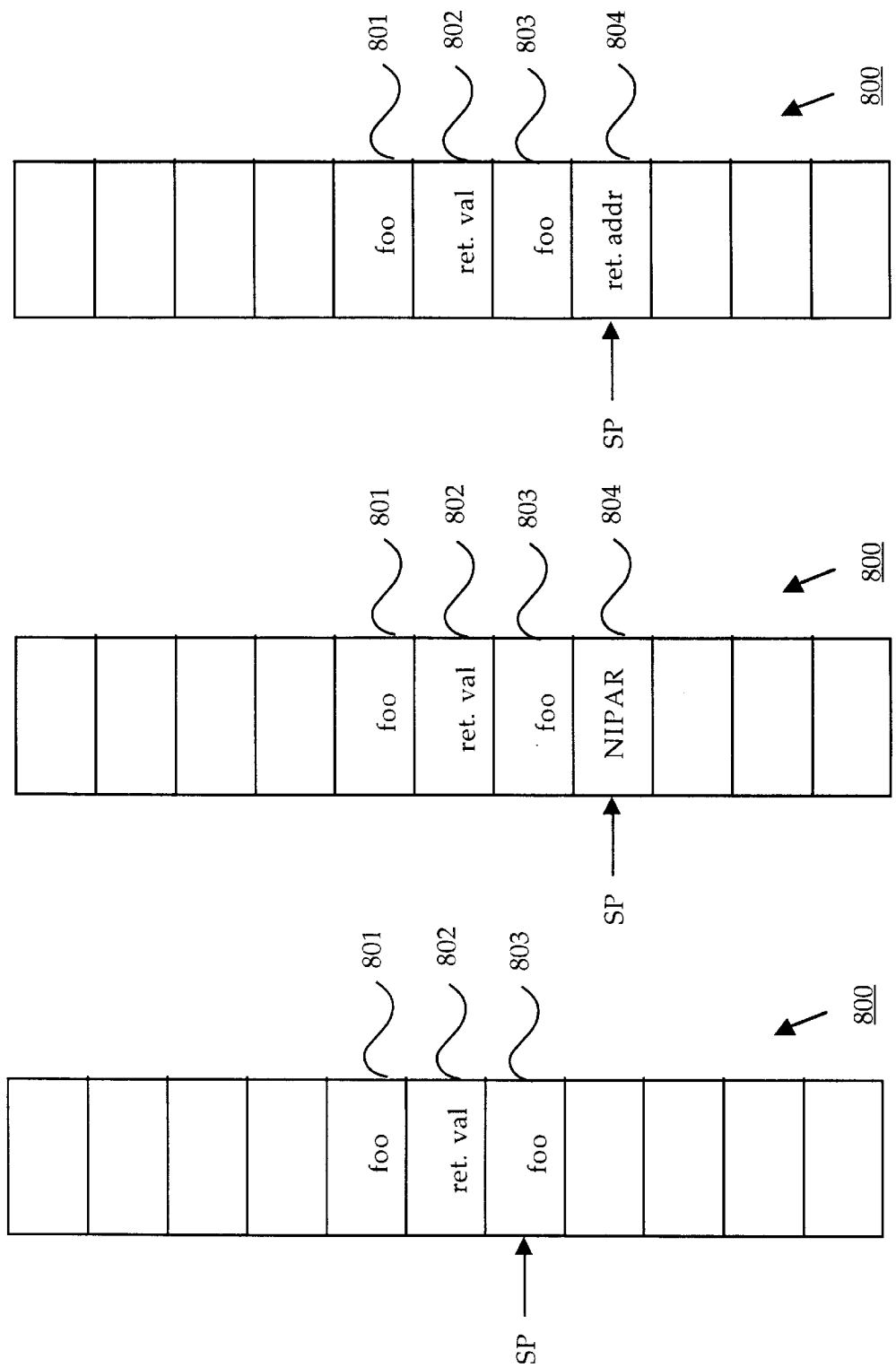

COMPILING SYSTEM AND METHOD FOR RECONFIGURABLE COMPUTING

CROSS-REFERENCE TO RELATED APPLICATION

The present invention is a continuation-in-part of U.S. patent application Ser. No. 08/423,560, now U.S. Pat. No. 5,794,062, entitled "System and Method for Scalable, Parallel, Dynamically Reconfigurable Computing," filed on Apr. 17, 1995.

BACKGROUND OF THE INVENTION

1. Field of the Invention

The present invention relates generally to software for reconfigurable computers, and more particularly to a compiling system and method for generating executable files for use in a dynamically reconfigurable processing unit having changeable internal hardware organization.

2. Description of Background Art

Related application Ser. No. 08/423,560, entitled "System and Method for Scalable, Parallel, Dynamically Reconfigurable Computing," describes a software-programmed reconfigurable computing architecture employing field-programmable gate arrays (FPGAs). The architecture is scalable, flexible and reconfigurable. A scalable parallel interconnection capability is implemented as a built-in architectural primitive. Thus, the described implementation machine can include any number of processors.

In the prior art, attempts have been made to provide reconfigurable machines. A first such prior art approach is that of downloadable microcode machines, wherein the behavior of fixed, nonreconfigurable hardware execution resources can be selectively altered by using a particular version of microcode loaded into a programmable control store. See, for example, J. L. Hennessy and D. A. Paterson, *Computer Architecture: A Quantitative Approach*, Morgan Kaufmann, 1990. In some such systems, microcode can be written or altered by the user after manufacture. See, for example, W. T. Wilner, "Design of the Burroughs B1700," in *AFIPS Fall Joint Computer Conference*, AFIPS Press, 1972; W. G. Matheson, "User Microprogrammability in the HP-21MX Minicomputer," in *Proceedings of the Seventh Annual Microprogramming Workshop*, IEEE Computer Society Press, 1974. Because the fundamental computational hardware in such prior art systems is not itself reconfigurable, such systems do not provide optimized computational performance when considering a wide range of problem types. Specifically, such systems are generally unable to alter the data path, are limited by the size of the execution units, and are only able to provide alternate instruction sets for the same hardware. Such systems do not provide a single compiler that is capable of compiling for two different architectures.

A second prior art approach involves a system in which the hardware which performs a computation is implemented using programmable logic. Examples exist that use off-the-shelf FPGAs (PAM, SPLASH, VCC) and custom programmable logic (TERAMAC). See, for example: P. Bertin et al., *Programmable Active Memories: A Performance Assessment*, Tech. Rep. 24, Digital Paris Research Laboratory, March 1993; D. A. Buell et al., *Splash 2: FPGAs in a Custom Computing Machine*, IEEE Computer Society Press, 1996; S. Casselman, "Virtual Computing and The Virtual Computer," in *IEEE Symposium on FPGAs for Custom Computing Machines*, IEEE Computer Society Press, 1994; R. Amerson et al., "Teramac-Configurable Custom Computing," in *IEEE Symposium on FPGAs for Custom Computing Machines*, IEEE Computer Society Press, 1995. In general, these technologies require that an application be specified in terms of a hardware description, expressed either as a schematic or using a hardware description language such as VHDL, rather than by writing software for a computer defined by FPGAs. For example, PAM is programmed by writing a C++ program that generates a netlist describing gate configuration and architecture. An application developer specifies a data structure representing a hardware description for implementing the application, rather than compiling a specification of an application algorithm. SPLASH is programmed in one of three ways: 1) a schematic capture package for building a hardware specification-based on a schematic diagram; 2) hardware description language (such as VHDL) coupled with a synthesis package which translates the VHDL into gate primitives; or 3) DBC, a C-language subset that is compiled into gate descriptions. TERAMAC is programmed using a schematic capture package or hardware description language. None of these programming techniques describes algorithmic steps; rather they provide mechanisms for specifying hardware architectures.

A third prior art approach involves reconfigurable computers which do execute software. The RISC 4005 and Hokie processor implement standard microprocessors within FPGAs. The RISC 4005 is essentially a demonstration of embedding a central processing unit (CPU) within a small portion of an FPGA whose other resources are dedicated to some coprocessor function. Hokie is used as an educational exercise in computer engineering. An ISA is selected before compilation and execution, and that ISA is used throughout. In addition, the bitstream for the processor is stored separately from the software which it executes. Ad hoc methods are used to ensure that a correct bitstream is loaded. See, for example, P. Athanas and R. Hudson, "Using Rapid Prototyping to Teach the Design of Complete Computing Solutions," in *IEEE Symposium on FPGAs for Custom Computing Machines*, IEEE Computer Society Press, 1996. These systems do not provide for reconfiguration at run-time (during execution).

Another prior art reconfigurable computer is the Dynamic Instruction Set Computer (DISC), which employs a reconfigurable processing unit. See, for example, M. J. Wirthlin and B. L. Hutchings, "A Dynamic Instruction Set Computer," in *IEEE Symposium on FPGAs for Custom Computing Machines*, IEEE Computer Society Press, 1995; D. A. Clark and B. L. Hutchings, "The DISC Programming Environment," in *IEEE Symposium on FPGAs for Custom Computing Machines*, IEEE Computer Society Press, 1996. The execution and configuration of the DISC processing unit FPGA is controlled by a microcontroller, also implemented in an FPGA. The microcontroller is programmed from a dialect of the C programming language. The compiler for this C dialect recognizes that certain program statements are to be executed by corresponding hardware configurations of the processing unit, and emits microcontroller code that causes the correct configuration bitstream to be loaded into the processing unit during execution. One skilled in the art will recognize that the microcontroller itself has a fixed instruction set, and that the compiler compiles to this fixed instruction set. There are several disadvantages to the architecture used by DISC. Since the microcontroller is fixed, it cannot be optimized for controlling different types of processing units. The configuration bitstreams are stored in external hardware outside of the memory space of the microcontroller, and thus the system is not self-contained. Additionally, the above-referenced documents do not disclose how DISC could be used for parallel computation, global signaling and clocking, or interrupt handling. Finally, new instructions are specified as atomic entities. The compiler only emits instructions for one instruction set, but allows individual instructions to be added by the programmer. Each processing unit configuration is a single hard-coded instruction provided by the programmer, thus reducing potential flexibility.

A fourth prior art approach involves mixed systems, wherein different parts of the algorithm are mapped to different components of the system. One prior art system maps an algorithm expressed in an extended C dialect to a mixed FPGA/DSP architecture. The user explicitly marks sections of the input program for targeting to the DSP, while the rest of the code is compiled into gates for FPGA implementation. Such systems require specialized tools, since they employ a non-standard syntax for ISA changes. In addition, operation of such systems is cumbersome due to the use of netlists for FPGA specification of portions of the program. Such systems do not provide actual hardware reconfiguration, but merely provide capability for mapping to another piece of hardware.

Similarly, some systems employ a standard microprocessor with some configurable logic resources. These resources are used to implement special instructions which speed execution of particular programs. See, for example R. Razdan and M. D. Smith, "A High-Performance Microarchitecture with Hardware-Programmable Functional Units," in *Proceedings of the Twenty-Seventh Annual Microprogramming Workshop,* IEEE Computer Society Press, 1994. Such systems are typically implemented as a central processing unit (CPU) with a portion of the silicon die used to implement an FPGA. The CPU has a fixed data path to which the FPGAs are connected. The compiler combines selected assembly code sequences into single-instruction statements for execution by an FPGA. However, such systems generally operate only on existing assembly language code, and require an adjacent fixed ISA as a starting point. In addition, such systems do not generally provide run-time reconfiguration. Finally, such systems are not broadly applicable and typically do not provide a significant speed improvement over other conventional systems.

Though the above-mentioned systems each provide some level of reconfigurability of hardware, none of them describes a method or apparatus for encapsulating binary machine instructions and data along with the hardware configurations required to execute the machine instructions in the manner claimed herein. In addition, none of the prior art systems discloses either multiple-architecture ISA reconfiguration on a level of granularity comparable to RISC or CISC instructions as claimed herein, or compilation methods within a C-language syntax for execution on dynamically reconfigured ISAs as claimed herein.

SUMMARY OF THE INVENTION

In accordance with the present invention, there is provided a system and method of compiling source code written in, for example, C or Pascal, to generate executable files for use in a dynamically reconfigurable processing unit having a selectively changeable internal hardware organization. In one embodiment, the present invention is capable of encapsulating machine instructions and data along with hardware configurations required to execute the machine instructions. In the reconfigurable architecture, each individual processor consists of, for example: reconfigurable processor hardware, such as a complete FPGA-based processor, a data and program memory, a parallel interconnect device, and rewritable storage for FPGA configuration bits. By dynamically loading FPGA configuration bitstreams, the present invention implements a dynamic ISA computer which achieves high performance by using ISAs optimized for particular phases of application execution.

In the architecture of the present invention, applications are provided as software, hardware is supplied in the form of circuits (a central services module, processor modules, input/output (I/O) modules), and bitstreams for Instruction Set Architectures (ISAs) which are hosted on the processor module FPGAs. An ISA is a primitive set of instructions that can be used to program a computer. Application software is executed by FPGAs configured as ISAs on the processor modules.

The present invention describes a system designed to allow FPGA configuration bitstreams to be statically linked at compile time with the program that executes them, and programmed for dynamic switching of ISAs and/or FPGA application element implementations independently, at runtime.

The ISAs execute program instructions stored in RAM 133. These program instructions selectively include one or more reconfiguration directives. Upon selection of a reconfiguration directive, the hardware is reconfigured to provide an optimized implementation of a particular ISA. Thus, each ISA, in addition to its specific functionality, contains an instruction or directive that causes a different ISA to be loaded into the reconfigurable processor, after which software execution continues using the new ISA.

Since the location of the ISA bitstreams in memory is an argument to the reconfiguration instruction, this location is preferably determined at link or load time, just as the locations for function call targets and variables are determined. Just as with functions and variables, it has been found desirable to use symbolic names for the address of a bitstream. The present invention employs an object file format that extends the notion of executable software to include ISA bitstreams. Several benefits result, such as:

Ease of tool construction. Since reconfiguration is treated as an instruction and bitstreams as data, standard software linking techniques can be applied to binding software controlled hardware changes to the required bitstream. No new software technology, beyond the bitstream-as-data abstraction, need be created.

Flexibility in loading. By isolating reconfiguration data to a section of the executable, the ability to load configurations into protected regions of memory is simplified. Memory alignment issues are easy to deal with in a structured way, as will be described in more detail below.

Simplified loading. All data required to execute the program are kept in a single file, so no load time identification or location of bitstreams need be performed if the executable is statically linked.

Simplified configuration management. Only a single file need be maintained once a program has been linked. This simplifies the process of distributing applications to individual machines and remote sites.

BRIEF DESCRIPTION OF THE DRAWINGS

FIGS. 8A, 8B, and 8C are diagrams of stack contents during a structured reconfiguration according to the present invention.

DETAILED DESCRIPTION OF THE INVENTION

The present invention is directed toward a compiling system and method for generating executable files for use with a dynamically reconfigurable processing unit.

Reconfigurable Computing System Architecture

Figure 1:
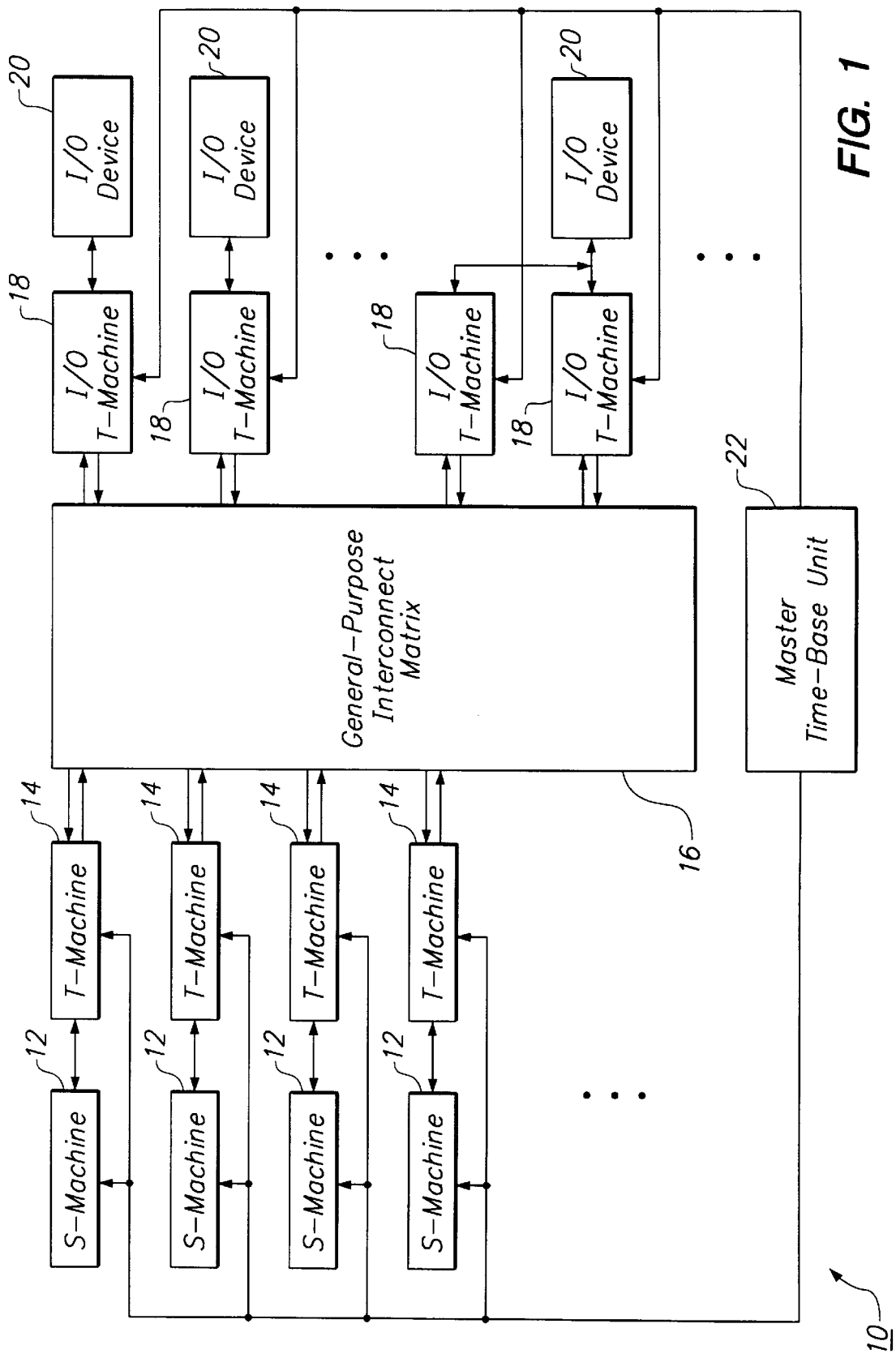
FIG. 1 is a block diagram of the hardware components of a dynamically reconfigurable computing architecture.

Referring now to FIG. 1, there is shown a block diagram of a scalable, parallel, dynamically reconfigurable computer 10 for executing object files generated in accordance with the present invention. Computer 10 preferably comprises at least one S-machine 12, a T-machine 14 corresponding to each S-machine 12, a General Purpose Interconnect Matrix (GPIM) 16, at least one I/O T-machine 18, one or more I/O devices 20, and a master time-base unit 22. In the preferred embodiment, computer 10 comprises multiple S-machines 12, and thus multiple T-machines 14, plus multiple I/O T-machines 18 and multiple I/O devices 20.

Each of the S-machines 12, T-machines 14, and I/O T-machines 18 has a master timing input coupled to a timing output of the master time-base unit 22. Each S-machine 12 has an input and an output coupled to its corresponding T-machine 14. In addition to the input and the output coupled to its corresponding S-machine 12, each T-machine 14 has a routing input and a routing output coupled to the GPIM 16. Similarly, each I/O T-machine 18 has an input and an output coupled to an I/O device 20, and a routing input and a routing output to the GPIM 16.

Each S-machine 12 is a dynamically reconfigurable computer. The GPIM 16 forms a point-to-point parallel interconnect means that facilitates communication between T-machines 14. The set of T-machines 14 and the GPIM 16 form a point-to-point parallel interconnect means for data transfer among memories attached to S-machine 12. Similarly, the GPIM 16, the set of T-machines 14, and the set of I/O T-machines 18 form a point-to-point parallel interconnect means for I/O transfer between S-machines 12 and each I/O device 20. The master time-base unit 22 comprises an oscillator that provides a master timing signal to each S-machine 12 and T-machine 14.

In an exemplary embodiment, each S-machine 12 is implemented using a Xilinx XC4013 (Xilinx, Inc., San Jose, Calif.) Field Programmable Gate Array (FPGA) coupled to 64 Megabytes of Random Access Memory (RAM). Each T-machine 14 is implemented using approximately fifty percent of the reconfigurable hardware resources in a Xilinx XC4013 FPGA, as is each I/O T-machine 18. The GPIM 16 is implemented as a toroidal interconnect mesh. The master time-base unit 22 is a clock oscillator coupled to clock distribution circuitry to provide a system-wide frequency reference, as described in U.S. patent application Ser. No. 08/501,970, entitled "System and Method for Phase-Synchronous, Flexible Frequency Clocking and Messaging." Preferably, the GPIM 16, the T-machines 14, and the I/O T-machines 18 transfer information in accordance with the point-to-point protocol of the ANSI/IEEE Standard 1596–1992 defining a Scalable Coherent Interface (SCI).

Figure 1A:
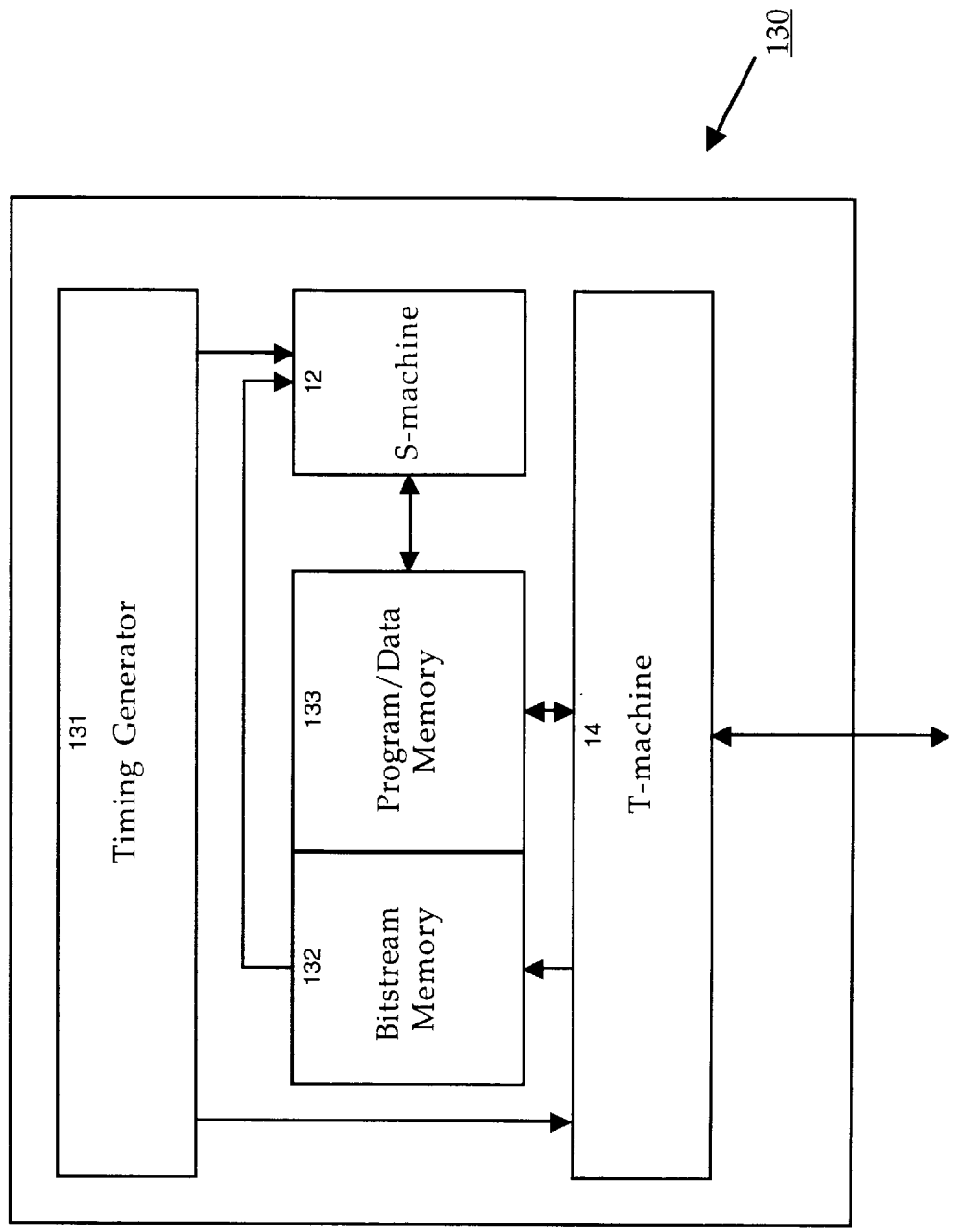
FIG. 1A is a block diagram of a processor module according to the present invention.

Referring now to FIG. 1A, there is shown a block diagram of a processor module 130 used in an embodiment of the present invention. S-machine FPGA 12 is connected to dedicated bitstream memory 132 and program/data memory 133, one or more T-machines 14, and clock generation circuitry such as timing generator 131 to form processor module 130. Module 130 is connected to other similar modules through T-machines 14 in such a manner that facilitates parallel operation. Program/data memory 133 stores program instructions, and is implemented as conventional RAM. Bitstream memory 132 stores bitstreams describing FPGA configurations. In one embodiment, program/data memory 133 is implemented as dynamic RAM (DRAM) and bitstream memory 132 is implemented as static RAM (SRAM).

Figure 1B:
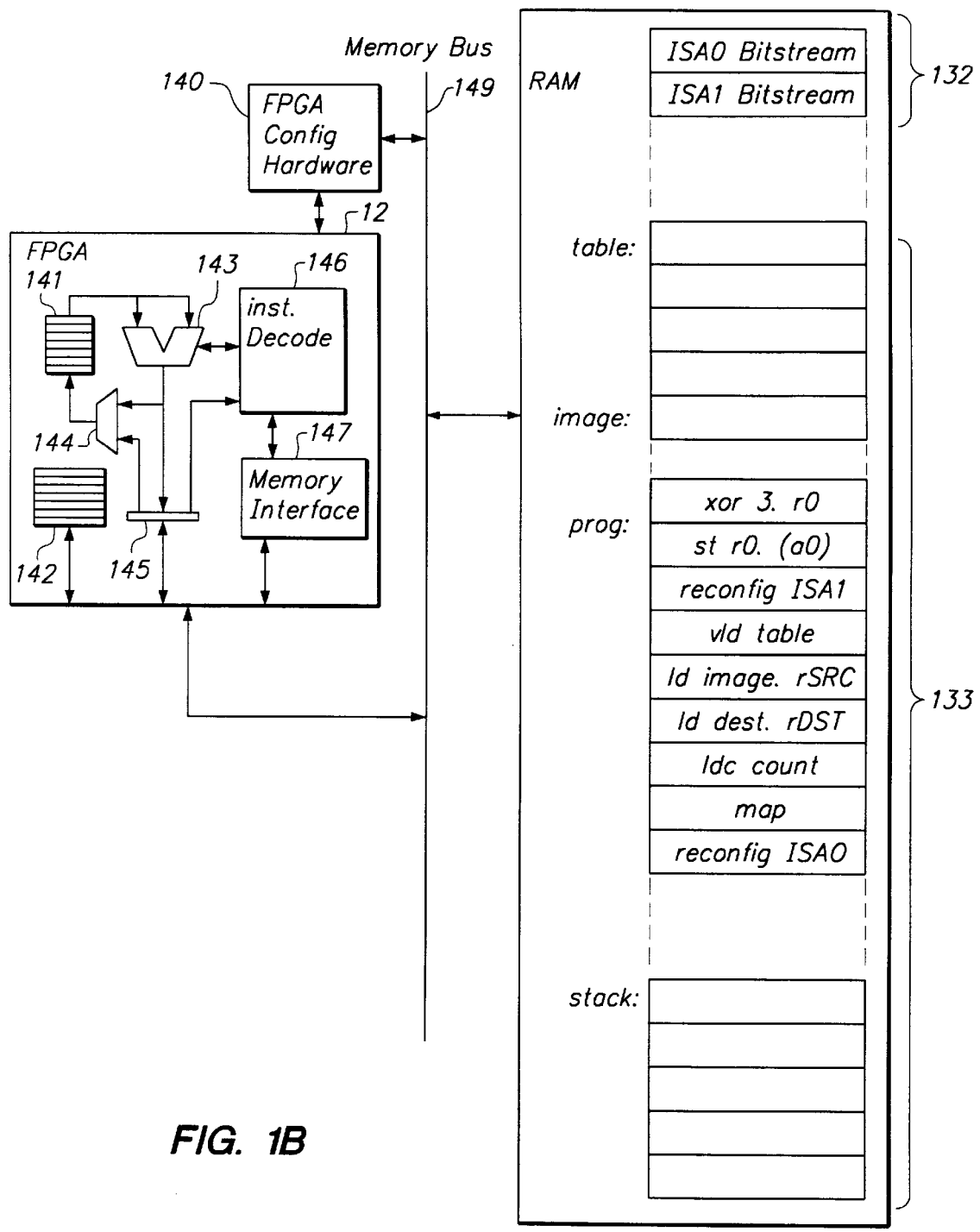
FIGS. 1B and 1C are block diagrams of a system architecture for implementing the present invention, showing an example of reconfiguration of an FPGA.
Figure 1C:
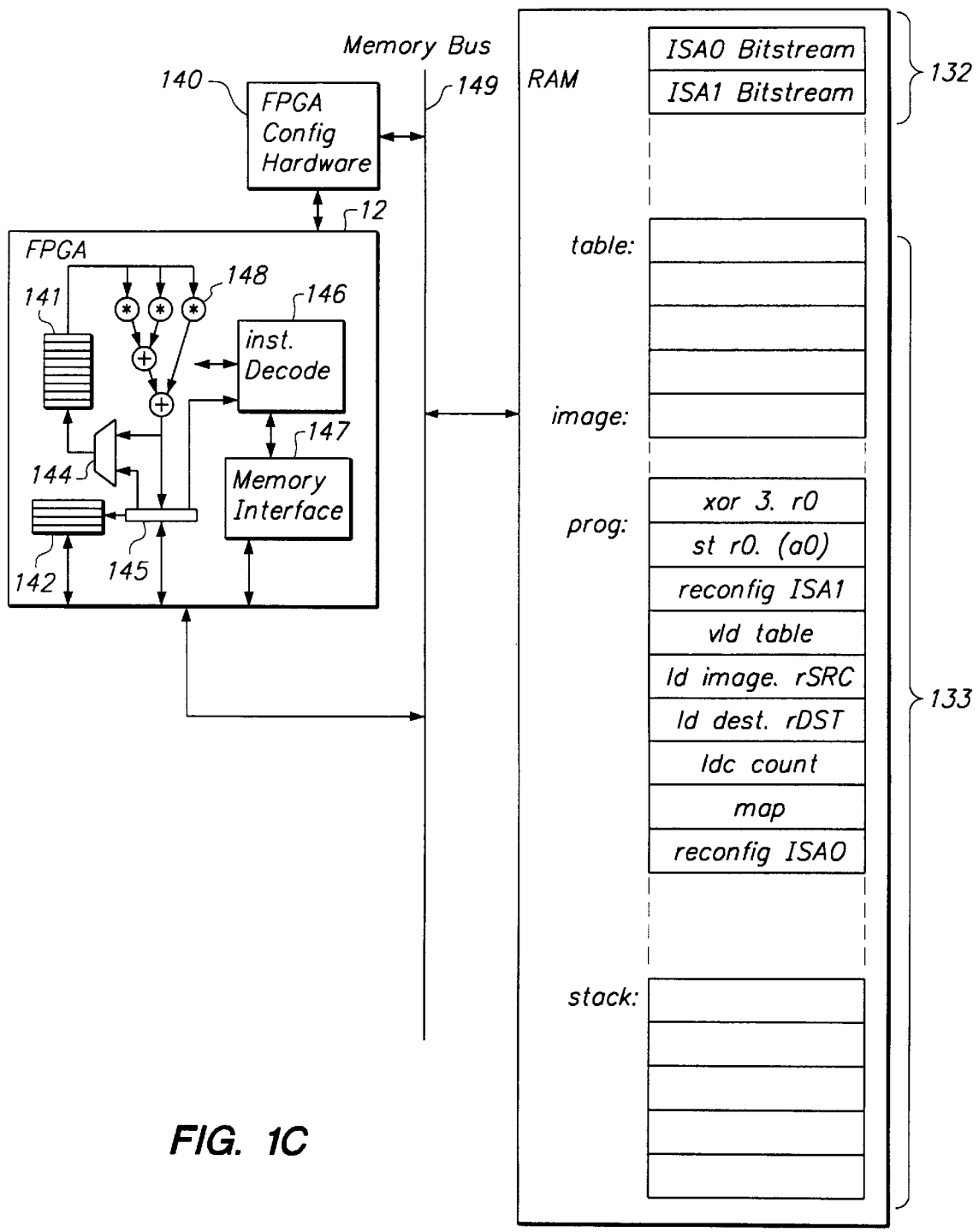

Referring now to FIGS. 1B and 1C, there are shown examples of FPGA reconfiguration to implement ISAs in a reconfigurable architecture. The Figures show block diagrams of a system architecture for implementing the present invention, with S-machine FPGA 12 reprogrammed to include an arithmetic logic unit (ALU) 143 in FIG. 1B and a finite impulse response (FIR) filter 148 in FIG. 1C. Bitstream RAM 132 and program/data RAM 133 are provided. Memory bus 149 provides a communications channel between S-machine FPGA 12 and RAM 132 and 133. FPGA configuration hardware 140 enables the reconfiguration of S-machine FPGA 12 according to ISA bitstreams from bitstream RAM 132. S-machine FPGA 12 configurations include, for example, data registers 141, address registers 142, a register multiplexer 144, and a memory data register 145. Any or all of these components may be modified or removed in other configurations, depending on the bitstream. For example, ALU 143 appears in the configuration shown in FIG. 1B, but is replaced by FIR filter 148 in the configuration of FIG. 1C.

Reconfiguration Directives

Figure 2:
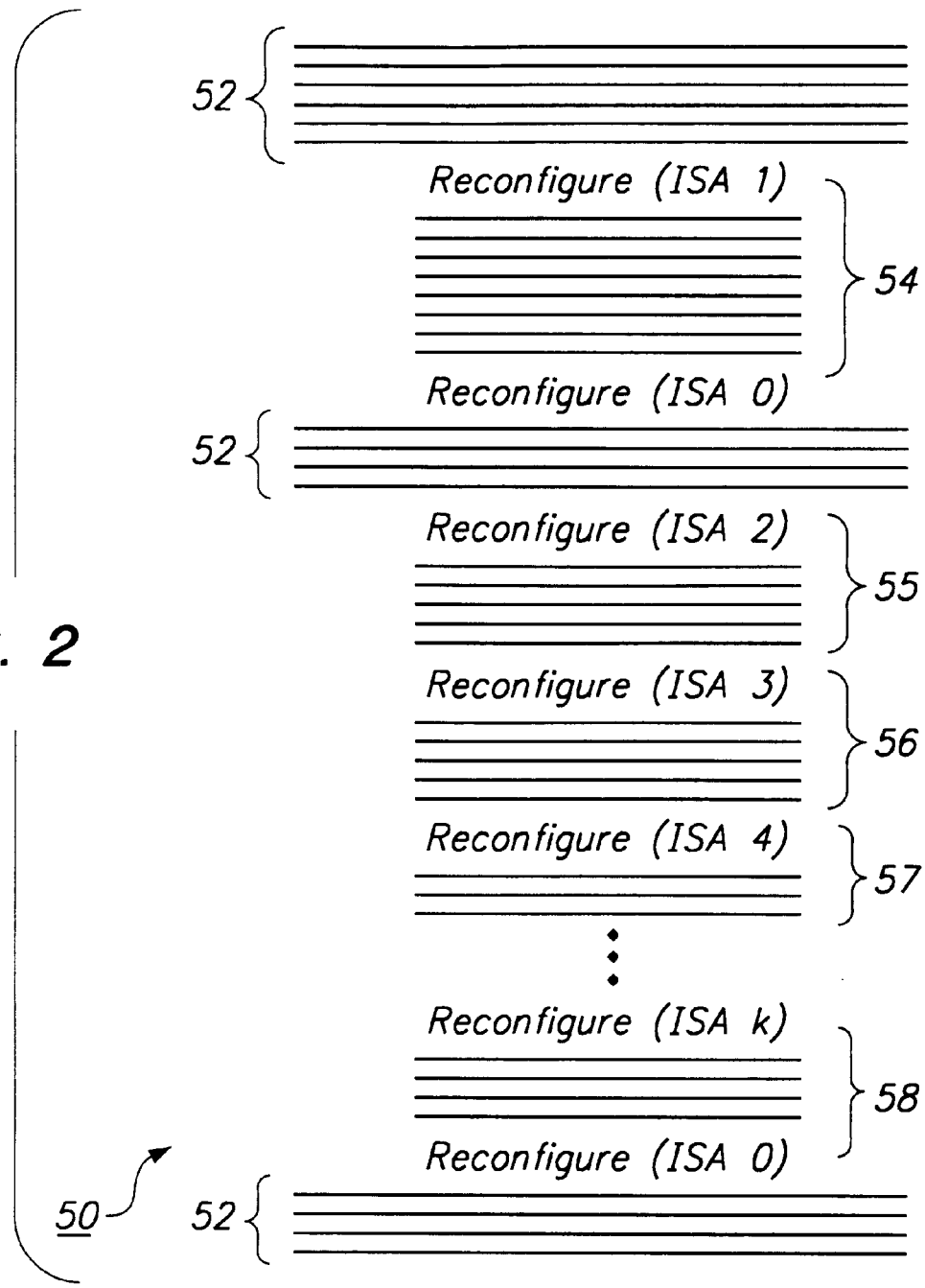
FIG. 2 is an example of a program listing including reconfiguration directives.

Computer 10 preferably stores program instructions in RAM selectively including reconfiguration directives for reconfiguring computer 10 by changing the configuration of S-machine 12. Referring now to FIG. 2, there is shown an exemplary program listing 50 including a set of outer-loop portions 52, a first inner-loop portion 54, a second inner-loop portion 55, a third inner-loop portion 56, a fourth inner-loop portion 57, and a fifth inner loop portion 58. Those skilled in the art will readily recognize that the term "inner-loop" refers to an iterative portion of a program that is responsible for performing a particular set of related operations, and the term "outer-loop" refers to those portions of a program that are mainly responsible for performing general-purpose operations and/or transferring control from one inner-loop portion to another. In general, inner-loop portions 54, 55, 56, 57, and 58 of a program perform specific operations upon potentially large data sets. One or more reconfiguration directives may be associated with a given inner-loop portion 54, 55, 56, 57, or 58, so that an appropriate ISA will be in context when the inner-loop portion is executed. In general, for any given program, outer-loop portions 52 of program listing 50 will include a variety of general-purpose instruction types, while inner-loop portions 54, 56 of program listing 50 will consist of relatively few instruction types used to perform a specific set of operations.

In exemplary program listing 50, a first reconfiguration directive appears at the beginning of first inner-loop portion 54, and a second reconfiguration directive appears at the end of first inner-loop portion 54. Similarly, a third reconfiguration directive appears at the beginning of second inner-loop portion 55; a fourth reconfiguration directive appears at the beginning of third inner-loop portion 56, and so on. Each reconfiguration command preferably references a configuration data set represented by a bitstream. The bit-stream specifies an internal hardware organization for each S-machine 12, including a Dynamically Reconfigurable Processing Unit (DRPU), an address operate unit (AOU), instruction fetch unit (IFU), and data operate unit (DOU) (not shown). Such hardware organization is dedicated to and optimized for the implementation of a particular Instruction Set Architecture (ISA). An ISA is a primitive or core set of instructions that can be used to program a computer. As conventionally used in the art, an ISA defines instruction formats, opcodes, data formats, addressing modes, execution control flags, and program-accessible registers. In the reconfigurable computing architecture employed for executing object files generated by the present invention, each S-machine can be rapidly runtime-configured to directly implement a sequence of ISAs through the use of a unique configuration data set for each desired ISA, specified by a bitstream. Thus, each ISA is implemented with a unique internal hardware organization as specified by a corresponding configuration data set. Thus, in the example of FIG. 2, the first through fifth inner-loop portions 54, 55, 56, 57, and 58 each correspond to a unique ISA, namely ISAs 1, 2, 3, 4, and k, respectively. Those skilled in the art will recognize that each successive ISA need not be unique. Thus, ISA k could be ISA 1, 2, 3, 4, or any different ISA. The set of outer-loop portions 52 also corresponds to a unique ISA, namely ISA 0. During program execution, selection of successive reconfiguration directives may be datadependent. Upon selection of a given reconfiguration directive, program instructions are subsequently executed according to a corresponding ISA via a unique S-machine hardware configuration as specified by the bitstream referenced by the reconfiguration directive.

With the exception of reconfiguration directives, exemplary program listing 50 of FIG. 2 preferably comprises conventional high-level language statements, for example, statements written in accordance with the C programming language.

Those skilled in the art will recognize that the inclusion of one or more reconfiguration directives in a sequence of program instructions requires a compiler modified to account for the reconfiguration directives. Accordingly, the compiling system and method of the present invention processes include reconfiguration directives by encapsulating references to bitstreams describing hardware configurations and by compiling source code in accordance with the specifications of particular ISAs identified by reconfiguration directives.

In one embodiment of the present invention, all the ISAs available to computer 10 support the following:

A stack pointer (SP) and a Next Instruction Pointer Address Register (NIPAR) (also known as a Program Counter (PC)), to implement stack-based storage of information and parameters during reconfiguration;

Appropriate assembly-language instructions for flow control, including for example jsr for subroutine entry and rts for subroutine return; and Appropriate memory interface unit for storing and loading register values to and from the stack.

The operation of these components in implementing reconfiguration will be described below in connection with FIGS. 6 through 8C.

Compiling System Components

Figure 3:
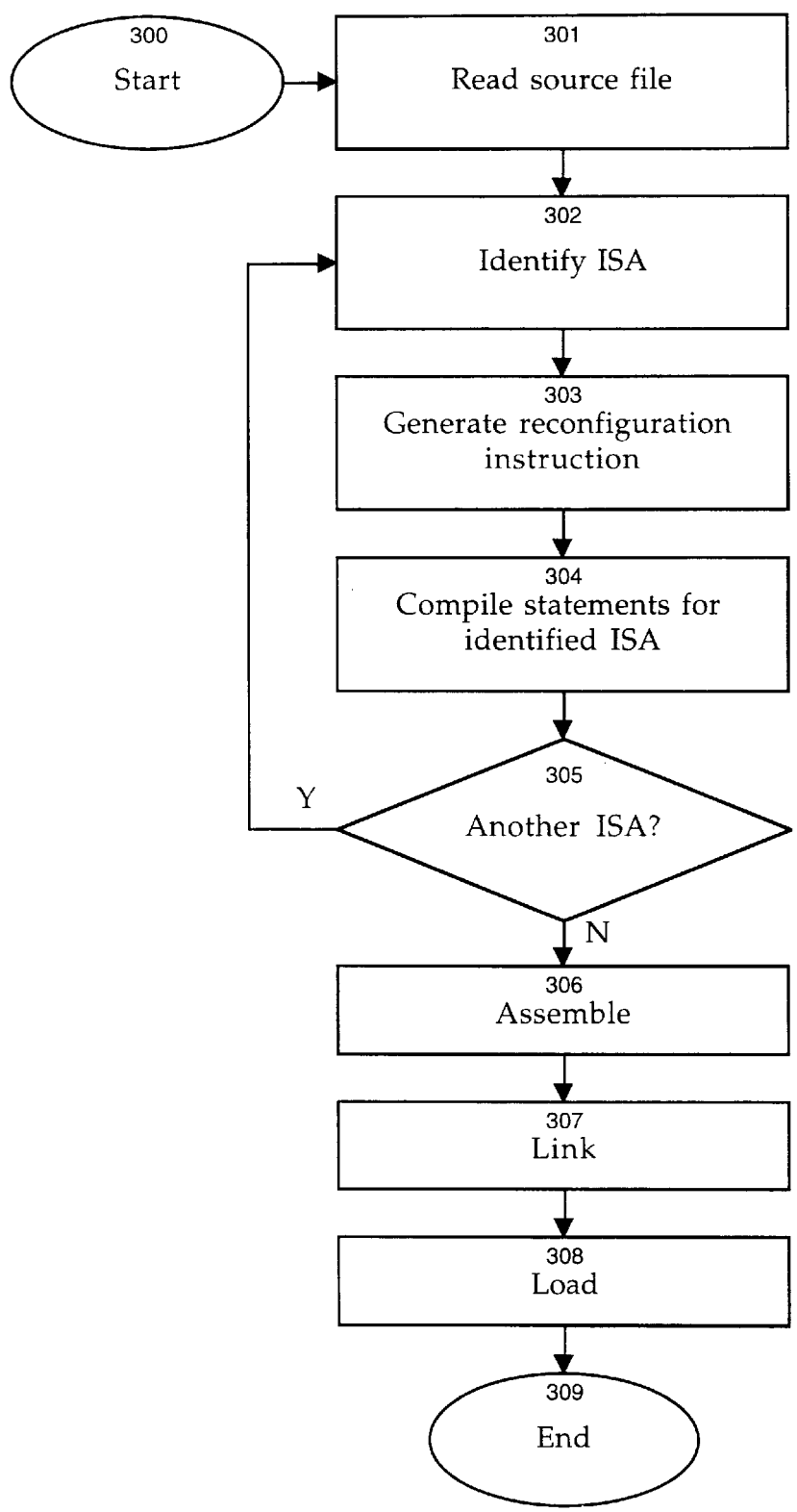
FIG. 3 is a flowchart of an overall compiling method performed by a compiler for dynamically reconfigurable computing.
Figure 3A:
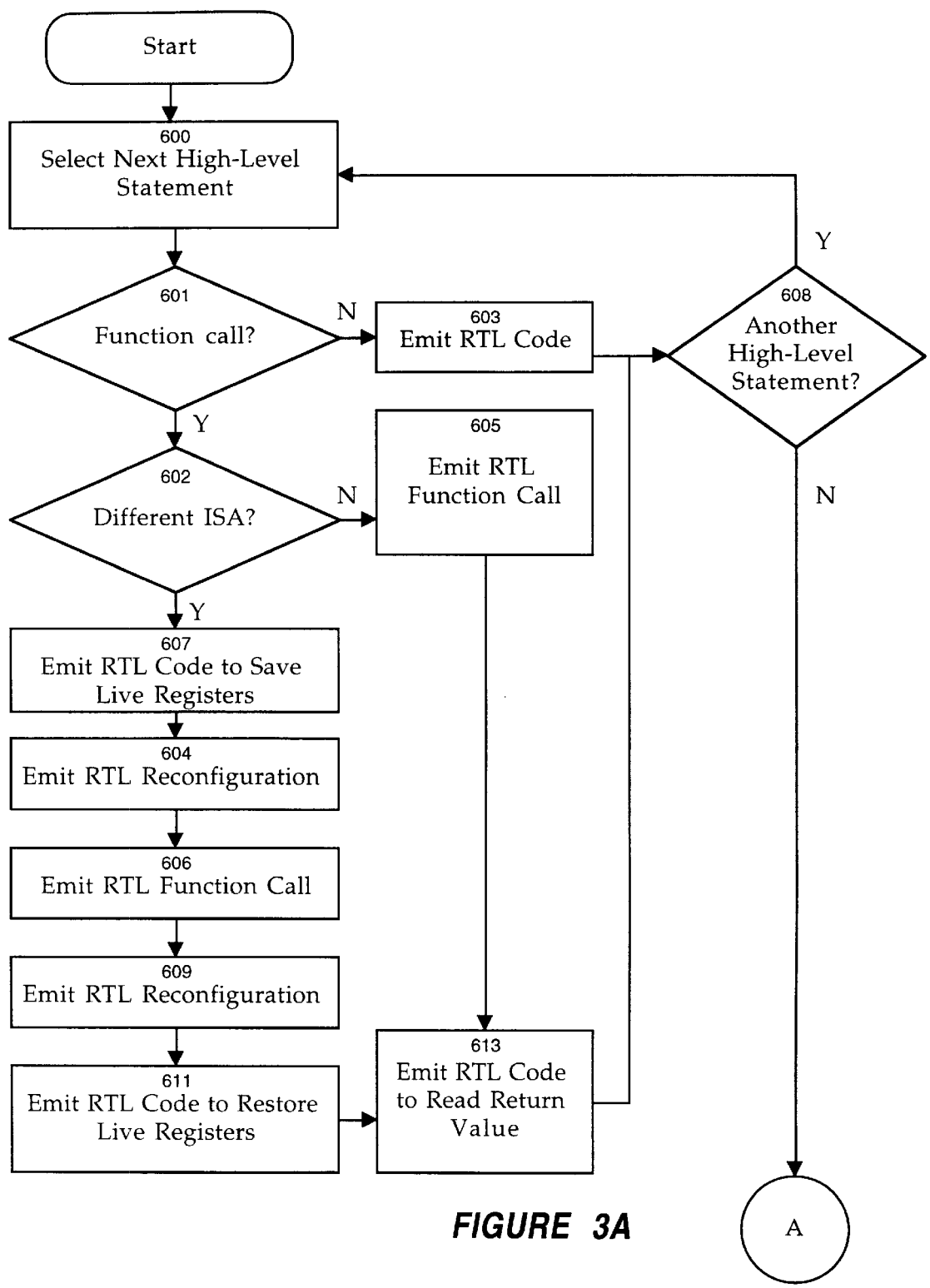
FIGS. 3A and 3B are a flowchart of preferred compiling operations performed by a compiler for dynamically reconfigurable computing.
Figure 3B:
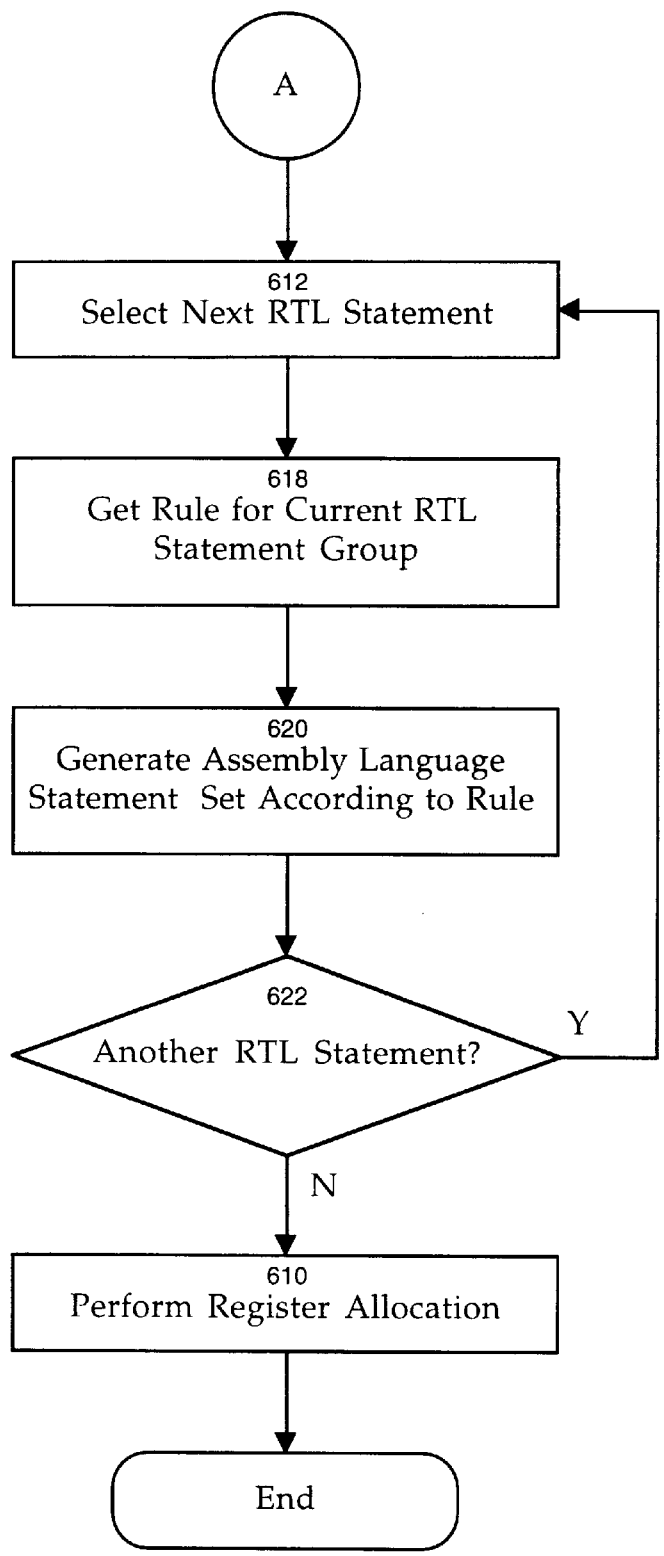
Figure 3C:
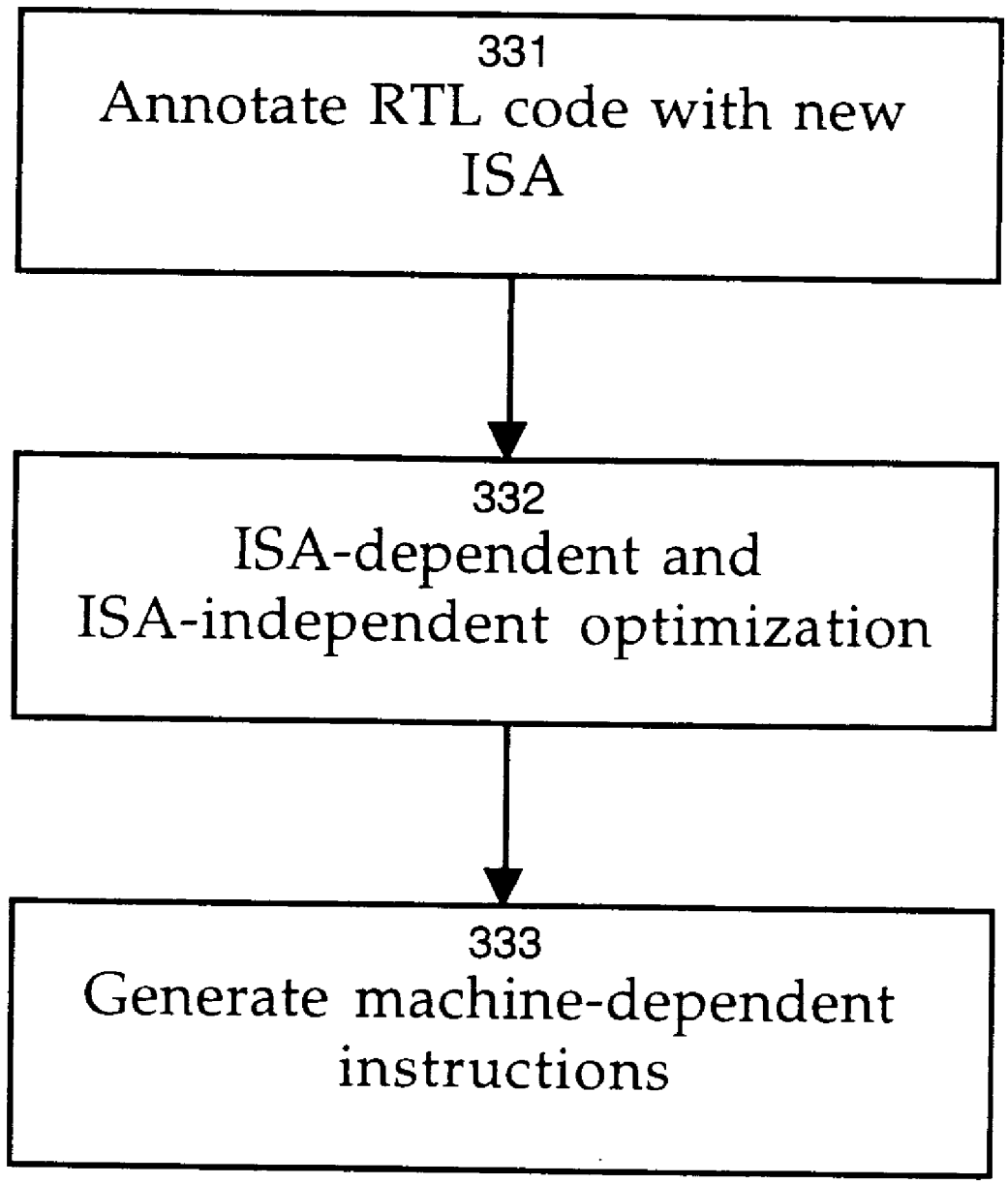
FIG. 3C is a flowchart of additional compiling operations performed by a compiler for dynamically reconfigurable computing.
Figure 4:
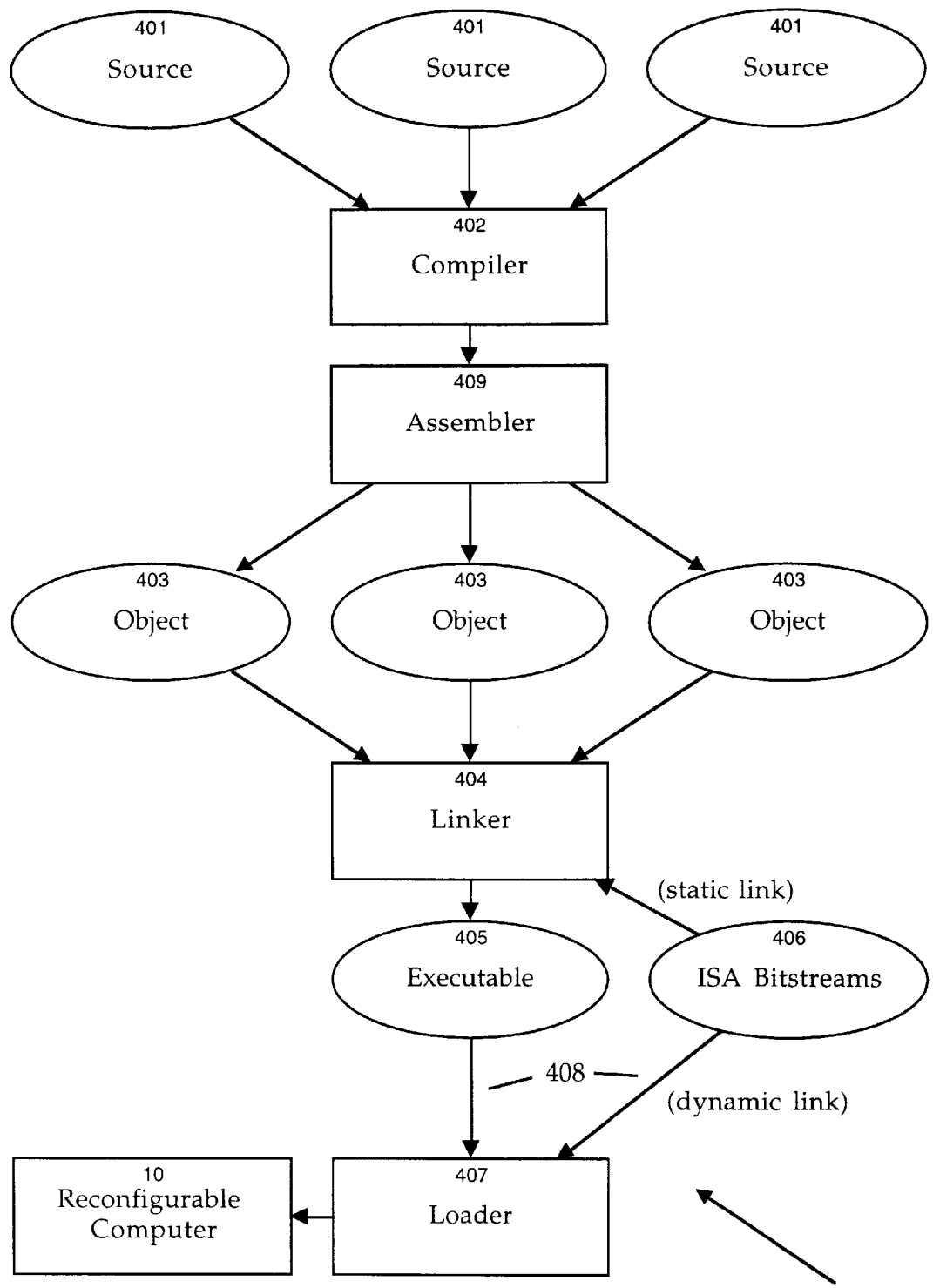
FIG. 4 is a block diagram of a compiling system according to the present invention.

Referring now to FIG. 4, there is shown a block diagram of compiling system 400 according to the present invention. The compiling system and method of the present invention runs on a typical workstation or personal computer employing a conventional operating system such as, for example, Unix. The Unix environment is advantageous because of the widespread availability of source code for software development tools, and the robustness of the user environment. As will be understood by those skilled in the art, the system and method of the present invention could also be run natively on the reconfigurable computer. Referring also to FIG. 3, there is shown a flowchart of an overall compiling, assembling, linking, and loading method according to the present invention. Further details of the compilation steps of FIG. 3 are provided below in connection with FIGS. 3A, 3B, and 3C.

Source files 401 are compiled with a specially-modified C compiler 402, described below. Compiler 402 reads 301 source files 401 containing source code instruction statements from disk storage or from some other input or storage device. Compiler 402 then identifies 302 an ISA for a subset of source code instruction statements. In one embodiment, ISAs are identified by reconfiguration directives, as will be described more fully below. Compiler 402 generates 303 appropriate reconfiguration instructions for specifying the identified ISA, and compiles 304 the subset of instructions for execution by the identified ISA to create assembly language statements. Compiler 402 then determines 305 whether a subsequent subset of instruction statements (typically a separate function within source file 401) is to be compiled with a different ISA. Again, in one embodiment such determination is made by checking for reconfiguration directives. If a different ISA is identified, compiler 402 returns to 302.

Otherwise, when the end of the source file is reached, the assembly language statements are assembled 306 by assembler 409 to create object files 403. Object files 403 are linked 307 using software linker 404 which has been modified to handle bitstream locations and 64-bit, bit-aligned addresses, to create an executable 405. As described below, executable 405 contains resolved references to ISA bitstreams 406 defining FPGA architectures. After executable 405 is created by linker 404, it is sent, via network connection 408, to loader 407 running on reconfigurable computer 10, for loading 308 into computer 10. In the case of a dynamic link, ISA bitstreams 406 are also sent via network connection 408 to loader 407.

Arbitrary and Structured Reconfiguration

In one embodiment, compiler 402 permits arbitrary reconfiguration, in which reconfiguration directives may be located at any point in the source code. In another embodiment, compiler 402 permits structured reconfiguration, in which reconfiguration directives are only permitted when calling or returning from a function, so that each function is labeled with a single ISA that is to be in context throughout execution of the function. While arbitrary reconfiguration may permit additional flexibility and smaller source code, structured reconfiguration provides improved predictability and determinism in ISA loading, leading to greater reliability. Since machine code is generally different for different ISAs, determinism is preferred so that the compiler is able to generate appropriate machine code for a particular segment of source code. Arbitrary reconfiguration, when combined with certain conditional constructs in the source code may lead to nondeterministic situations which are eliminated by using structured reconfiguration.

The following code excerpt is an example of nondeterministic reconfiguration that may occur when using arbitrary reconfiguration:

```
#pragma reconfig ISA0
...
x = 0;
if (a != 0) {
#pragma reconfig ISA1
} else {
#pragma reconfig ISA2
}
y = x + 2;
...
```

The ISA in context after the if statement cannot be determined at compile time because there are two possible paths for the control flow at run time, and each causes a reconfiguration to a different ISA. Therefore, the compiler cannot emit valid machine code for this procedure unless ISA1 and ISA2 are binary compatible. Such nondeterminism is eliminated when structured reconfiguration is used, since only one ISA can be specified per function.

In the above example, the value of the variable x is preserved during the reconfiguration operation, so that it may be accessed by the new ISA. In one embodiment, the value is stored in a register of ISA0 in a conventional manner. However, the reconfiguration into ISA1 or ISA2 may cause this register to cease to exist or to lose its value, so that the register cannot be relied upon to supply the value of x after the reconfiguration. Compiler 402 therefore keeps track of live register values that will be used after a reconfiguration, to ensure that their values are available when needed.

When using arbitrary reconfiguration, compiler 402 determines how to provide a subsequent ISA with access to a variable by taking into account how the current ISA has stored the variable as well as the facilities the subsequent ISA has to access it. In structured reconfiguration, the stack is employed to store values, as is conventional when passing values to or from a called function. Since the register architecture may change radically during reconfiguration, live variables are stored on the stack by the outgoing ISA, then reloaded by the subsequent ISA, as will be discussed in more detail below in connection with FIG. 6.

In one embodiment, compiler 402 implements known "inlining" optimization to allow structured reconfiguration to avoid the overhead of the JSR instruction. Inlining is a known technique for optimizing compilation of function calls by copying the operations of a called function "in line" so as to avoid the overhead associated with calling the function in a conventional manner. Thus, a code segment such as:

```
#pragma reconfig ISA1
jsr SUBROUTINE_A
#pragma reconfig ISA0
#pragma reconfig ISA2
jsr SUBROUTINE_B
#pragma reconfig ISA0
``` can be replaced by:

```
#pragma reconfig ISA1
< code from SUBROUTINE_A >
#pragma reconfig ISA0
#pragma reconfig ISA2
jsr SUBROUTINE_B
#pragma reconfig ISA0
``` thus improving performance by obviating the need for a jump and return, and associate stack writes involved in calling and returning from the function.

In addition, further optimization may be performed by eliminating all but the last reconfiguration directive when more than one reconfiguration directive appear in sequence. Thus, the third line (#pragma reconfig ISA0) may be deleted from the above code segment.

When using arbitrary reconfiguration, a called function may cause a reconfiguration which remains in effect after program flow returns to the calling function. For example, a called function containing the above code listing begins in one ISA, reconfigures twice, and then returns to a calling function. Subsequent statements in the calling function must therefore be considered to be using the ISA from the last reconfiguration. In one embodiment, compiler 402 performs inter-procedural analysis to determine which ISAs are in context at each function call and return. Where source files are separately compiled into object files before being linked into an executable, it may be difficult or impossible to determine which ISA will be in context after a called function returns. In such situations, ISA information may be stored, for example in header files, to specify which ISA is in context upon function entry and exit for all external functions called from a module. Alternatively, parameters may be passed among functions to specify ISA contexts.

When using structured reconfiguration, ISA information is provided in the declaration of the function, so that there is no need for compiler 402 to verify ISA specifications against control flow, and there is no possibility of unexpected reconfiguration occurring during a called function.

An additional advantage of structured reconfiguration is that it better represents the reconfiguration operation from a semantic point of view. Since reconfiguration generally carries a degree of overhead at least comparable to that of a function call, and involves many of the same types of operations, such as storage of values on a stack, it is desirable to provide a similar syntax for reconfiguration as for function calls. Structured reconfiguration couples the notion of reconfiguration with that of function calls and therefore accomplishes this semantic goal. Further examples of structured and arbitrary reconfiguration are discussed below.

Reconfiguration Directives

In the preferred embodiment, reconfiguration directives are preceded by #pragma, a standard meta-syntax provided by the C language to pass information to the compiler that falls outside the language syntax. The use of the #pragma syntax permits the reconfiguration directive to operate in the context of a C program. An example of a reconfiguration directive found in source code would be:

pragma func_isa func2 isa2

In one embodiment, three #pragma directives are provided. Each directive operates at a distinct level of granularity, or scope, and thereby affects a specific piece of code:

reconfig: effects an immediate reconfiguration to a new ISA (scope is any arbitrary block of code);

func_isa: specifies an ISA for a particular function (scope is the function); and default_func_isa: specifies a default ISA (scope is the entire file).

These reconfiguration directives result in Register Transfer Level (RTL) reconfiguration statements that provide the compiler with information for determining which ISA is needed for each block of code, as will be discussed in more detail below.

The following code listing is an example of the use of each of the above directives in a structured reconfiguration environment.

```
1   #include "icarus_types.h"
2   #include "icarus_isas.h"
3   #include "fixed.h"
4   #pragma default_func_isa ISA0
5   uns8 color_map [256];
6   #pragma func_isa build_color_map
        FIXED_POINT_ISA
7   void
8   build_color_map (int16 contrast)
9   {
10      unsigned color;
11      uns8 *color_map_tmp = color_map;
12      for (color = 0; color < 255U; color++) {
13          color_map_tmp [color] =
                fixed_mul_int8 (contrast, color);
14      }
15  }
16  void
17  map_contrast (int x, int y, uns8 *image)
18  {
19      register int i, tmp;
20      tmp = x * y;
21  #pragma reconfig BYTE_MAP_ISA
22      {
23          register int i;
24          register uns8 *map;
25          register uns8 *image_tmp;
26  #pragma isa_pragma map_pointer map
27  #pragma isa_pragma image_pointer image_tmp
28  #pragma isa_pragma loop_counter i
29          image_tmp = image;
30          map = color_map;
31          for (i = tmp; i>0; i--) {
32              *image_tmp = map [*image_tmp];
33              image_tmp++;
34          }
35      }
36  }
37  do_contrast(int x, int y, uns8 *image,
            uns8 contrast)
38  {
39      build_color_map (contrast);
40      map_contrast(x, y, image);
41  }
```

Line 4 of the code listing is an example of the default_func_isa directive, specifying that ISA0 is to be used for any functions that do not specify another ISA. The scope of this directive is the entire file; therefore, the directive applies to the entire listing as shown.

Line 6 of the code listing is an example of the func_isa directive, specifying that FIXED_POINT_ISA is the appropriate ISA for the function called build_color_map. The scope of this directive is the specified function.

Line 21 of the code listing is an example of the reconfig directive, specifying that BYTE_MAP_ISA is the appropriate ISA for the code block immediately following the directive. The scope of this directive is the code block shown in lines 22 to 35 of the code listing.

The following code listing is an example of the use of each of the above directives in an arbitrary reconfiguration environment.

```
1   unsigned char color_map [256];
2   /* int is 16 bits for supercomputer 1A */
3   typedef unsigned int uns16;
4   typedef unsigned char uns8;
5   void
6   build_color_map (uns16 contrast)
7   {
8       int color;
9   #pragma reconfig FixedIsa
10      for (color = 0; color < 256; color++) {
11          color_map [color]=
                fixed_mul_int8 (contrast, color);
12      }
13  }
14  map_contrast (int x, int y, uns8 *image)
15  {
16      register int i, tmp;
17      register uns8 *map;
18      tmp = x * y;
19  #pragma reconfig ByteMapIsa
20  #pragma map_pointer map
21  #pragma map_counter i
22  #pragma target_pointer image
23      i = tmp;
24      map = color_map
25      while (i--) {
26          *image = map [*image];
27          image++;
28      }
29  }
30  /* assume Isa0 upon entry to do_contrast */
31  do_contrast(int x, int y, uns8 *image,
            BinFrac *contrast)
32  {
33      build_color_map (contrast);
34      map_contrast (x, y, image);
35  }
```

Lines 9 and 19 contain reconfig directives which remain in effect until another reconfiguration directive is encountered. For arbitrary reconfiguration, the directives may occur at any point in the code, and are not restricted to function-level granularity.

Compiling Method

Referring now to FIGS. 3A and 3B, there is shown a flowchart of a preferred compiling method according to the present invention. FIG. 3A shows steps performed by the compiler front-end, while FIG. 3B shows steps performed by the compiler back-end. The front-end interprets reconfiguration directives and generates Register Transfer Level (RTL) statements which may be interpreted in a conventional manner by the back-end. As is known in the art, RTL statements are ISA-independent intermediate-level statements used in conventional compilers such as the GNU C compiler (GCC) produced by the Free Software Foundation (Cambridge, Mass.). RTL may be extended, according to the Stanford University Intermediate Format (SUIF) specification, as disclosed in Stanford SUIF Compiler Group, *SUIF: A Parallelizing & Optimizing Research Compiler,* Tech. Rep. CSL-TR-94-620, Computer Systems Lab, Stanford University, May 1994. For example, the source code statement:

x=y+3;

might be represented in RTL as follows:

r1<-y r0<-r1+3 x<-r0

The method of FIGS. 3A and 3B takes as its input source file 401 containing a sequence of high-level source code instruction statements and also containing at least one reconfiguration directive specifying an ISA for execution of successive statements. For illustrative purposes, a structured reconfiguration environment is assumed, wherein reconfiguration occurs at a function-by-function level. Compiler 402 front-end selects 600 a next high-level statement from source file 401, and determines 601 whether the selected high-level statement represents a function call. If not, compiler 402 emits 603 RTL code for the statement.

If in 601 compiler 402 determines that the statement is a function call, compiler 402 determines 602 whether the function being called operates in a different ISA than the ISA currently in context. If not, compiler 402 emits 605 RTL code for the function call and for reading 613 the return value of the function.

If in 602 compiler 402 determines that the function operates in a different ISA, compiler 402 emits RTL code required to effect the reconfiguration, including saving all live registers 607 and performing the reconfiguration 604. In the preferred embodiment, the RTL reconfiguration statement is a non-standard RTL statement that includes an ISA identification. Compiler 402 then emits 606 RTL code for the function call. Compiler 402 then emits 609 RTL code for reconfiguration back to the first ISA, for restoring 611 live registers, and for reading 613 the return value of the function.

Upon completion of 603 or 613, compiler 402 determines 608 whether another high-level statement requires consideration. If so, compiler 402 returns to 600; otherwise it proceeds to 610.

Referring now to FIG. 3B, compiler 402 back-end performs 610 through 622 to translate previously-generated RTL statements into assembly language.

Compiler 402 then selects 612 a next RTL statement within a currently-considered RTL statement group. Compiler 402 gets 618 a rule specifying a manner in which the current RTL statement group can be translated into a set of assembly-language statements exists for the currently-considered RTL statement group. Compiler 402 generates 620 a set of assembly language statements corresponding to the currently-considered RTL statement group according to the rule. Compiler 402 then determines 622 whether another RTL statement requires consideration within the context of a next RTL statement group. If so, compiler 402 returns to 612. Otherwise, compiler 402 performs 610 register allocation operations. As is known in the art, a consistent register architecture from one ISA to another is not an absolute requirement. In particular, certain inner-loop ISAs may have special registers to which standard register allocation operations do not apply. However, in general, outer-loop ISAs are able to use standard register allocations For example, the above-listed RTL code could be translated into assembly code such as the following, though the assembly code would differ from ISA to ISA:

ld    y, r3 ld    [r3], r0 add   3, r0 st    r0, [x]

Thus, compiler 402 selectively and automatically generates assembly language statements in accordance with multiple ISAs during compilation operations. In other words, during the compilation process, compiler 402 compiles a single set of program instructions from source files 401 according to a variable ISA. Compiler 402 is preferably a conventional compiler modified to perform the preferred compiling operations described above in connection with FIGS. 3A and 3B.

Referring again to FIG. 4, assembler 409 operates to take assembly language statements generated by compiler 402 to produce object files 403. Object files 403 are then linked by linker 404 which handles bitstream locations and 64-bit, bit-aligned addresses, to create an executable 405. Loader 407 concatenates like segments from a plurality of object files 403, including bitstream segments, into a single memory image for transmission to reconfigurable computer 10. In one embodiment, such concatenation is done at run-time; in an alternative embodiment it is done off-line. It is advantageous if linker 404 is able to perform memory alignment on executable 405 to account for alignment requirements of the FPGA bitstream. Certain FPGA loading hardware requires bitstreams of constant size. Therefore, linker may perform memory alignment by padding bitstreams in order to conform to the requirements of such hardware.

When static linking is used, ISA bitstreams 406 and executables 405 are joined by linker 404 at link time. When dynamic linking is used, ISA bitstreams 406 and executables 405 are joined at load time, so that executable 405 and bitstreams 406 are sent, via network connection 408, to loader 407 running on reconfigurable computer 10.

Referring now to FIG. 3C, there is shown a flowchart of additional steps that are performed in generating assembly language code according to one embodiment of the present invention. This flowchart details the intermediate files that are generated as RTL code is transformed into machine-readable code for a reconfigurable computer. RTL code is annotated 331 to indicate which ISA is in context for each RTL statement in the code. RTL statements are not modified at this stage. The code is then optimized 332 by ISA-dependent and ISA-independent methods by an optimizing utility. Although the optimizing utility performs ISA-dependent optimization, its output uses machine-independent code. Thus, the output would still run with any ISA, though not necessarily optimally. Finally, machine-dependent instructions are generated 333 from the optimized code by assembler 409. This code uses abstract registers and other machine-dependent features. Additional cleanup of links and other minor steps may then be performed.

In the preferred embodiment of the present invention, ISAs include a reconfig instruction, which causes the FPGA of S-machine 12 to load a bitstream referenced by an argument of the instruction. Thus, each ISA has at least one relocation type related to relocating bitstream addresses used as an argument to the ISA's reconfig instruction. The relocation entry in the object file tells the linker to substitute the actual address of an entity into a segment of an executable at link time. Relocation types are described in more detail below.

As will be described below, bitstreams are defined as data objects which are located in a particular section, possibly read-only, and therefore standard relocation techniques are able to provide relocation of bitstream addresses used with ISA reconfig instructions in an analogous way to any program-defined read-only data.

Reconfigurable computer 10 executes the results from the loader as described in related U.S. Patent Application for "System and Method for Scalable, Parallel, Dynamically Reconfigurable Computing." In particular, reconfigurable computer 10 recognizes reconfig instructions and loads appropriate ISA bitstreams as specified in arguments to such instructions.

Preservation of Program State

FPGA reconfiguration by loading a new ISA may result in loss of internal hardware state information. Consequently, the system and method of the present invention preserves program state during reconfiguration to avoid loss of the execution thread during such hardware transitions.

During reconfiguration, reconfigurable computer 10 preferably uses a call stack to store any data that may be required after the new ISA has been loaded. Such storage is accomplished by pushing values onto the call stack and storing the stack pointer in a predefined memory location that will not be affected by the reconfiguration. Subsequent to reconfiguration, reconfigurable computer 10 uses the stack pointer to pop the previously-stored values from the call stack.

Stacks are known in run-time environments for running machine programs compiled from high-level languages that support recursion, such as C/C++, Lisp, and Pascal. A stack is implemented in an area of memory, and a stack pointer (SP) is employed in the ISA to hold the address of the top of the stack. A value, such as program data or address, is stored in the stack (or "pushed onto" the stack) by decrementing SP and writing the value to the address contained in SP. A value is retrieved from the stack (or "popped from" the stack) by reading the value from the address contained in the SP register, then incrementing SP.

In the present invention, the dynamic state of the program, such as local variables, and the location of the next instruction for the hardware to execute, typically stored in a Next Instruction Pointer Address Register (NIPAR) or a Program Counter (PC), are stored on the stack prior to reconfiguration of the hardware. SP is saved in a predetermined memory address. Thus, the values of SP and NIPAR are preserved through the hardware reconfiguration so that they can be later retrieved when execution resumes.

Figure 6:
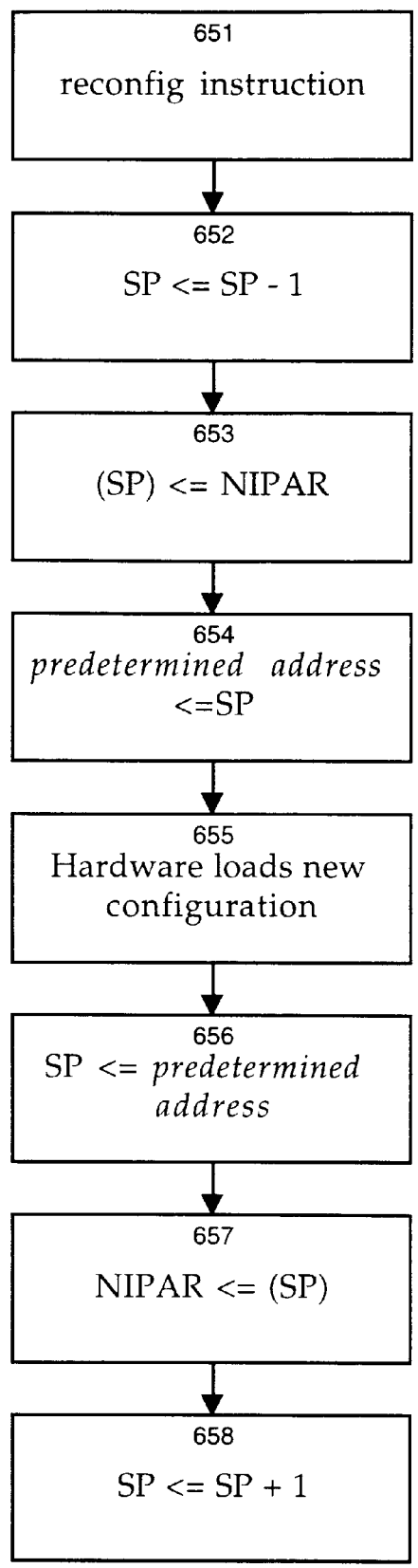
FIG. 6 is a flowchart of a method of preserving program state according to the present invention.

Referring now to FIG. 6, there is shown a flowchart of a method of preserving program state according to the present invention. A reconfig instruction is received 601, indicating that a bitstream representing a new ISA configuration is to be loaded into the processor hardware. The argument to the reconfig instruction is a physical memory address that holds the ISA configuration to be loaded.

SP is decremented 652 and NIPAR is loaded into the address indicated by SP 653, thus pushing NIPAR onto the stack. SP is saved at a predetermined address 654 in memory which is known to the new ISA configuration. The new ISA configuration is then loaded 655 into the hardware by causing FPGA 12 to read the ISA bitstream from a location in bitstream memory 132. Once the new configuration has been loaded, it loads SP from the known predetermined address 656 and then loads NIPAR from the stack by retrieving it from the memory location stored in SP 657 and incrementing SP 658. An example of stack contents during the reconfiguration operation of FIG. 6 is described below in connection with FIGS. 8A, 8B, and 8C.

Implementation of Structured Reconfiguration

Figure 7:
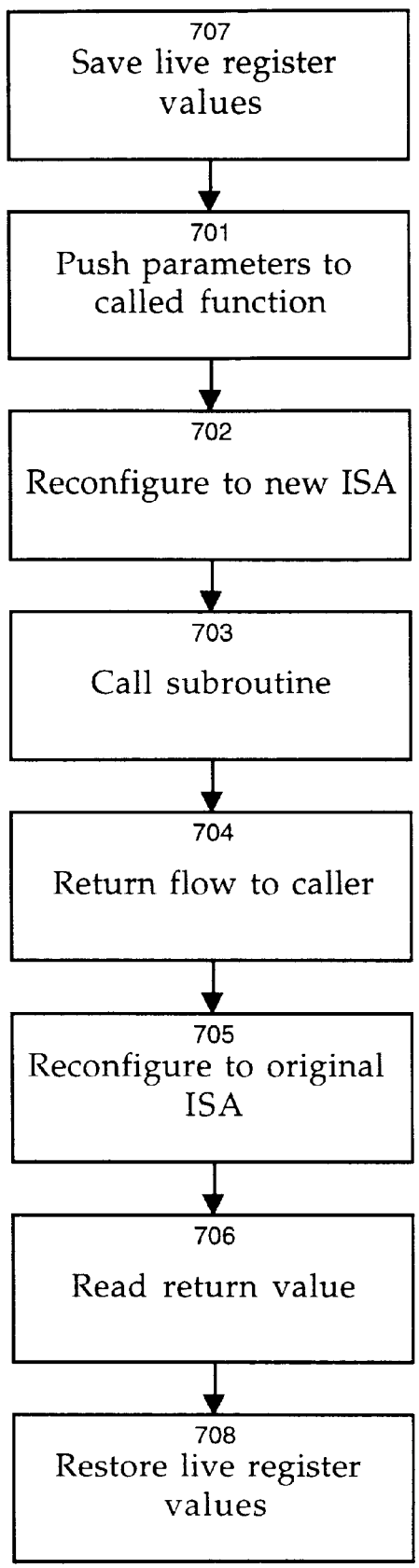
FIG. 7 is a flowchart of a method of structured reconfiguration according to the present invention.

In one embodiment of the present invention, structured reconfiguration is accomplished by compiling reconfig statements from the source code into a sequence of assembly language instructions. As described previously, in structured reconfiguration, reconfiguration directives are only permitted when calling or returning from a function, so that each function is labeled with a single ISA that is to be in context throughout execution of the function. Referring now to FIG. 7, there is shown a flowchart of a method of implementing structured reconfiguration according to one embodiment of the present invention.

The method of FIG. 7 is employed when a calling function invokes a called function that has an ISA reconfiguration instruction. S-machine 12 saves 707 live register values sot that they will not be lost as a result of the reconfiguration. S-machine 12 uses the current ISA to push 701 parameters to the called function onto a stack, since those parameters may reside in registers. S-machine 12 reconfigures 702 to the new ISA and calls 703 the subroutine representing the function using an instruction, such as jsr, of the destination function's ISA. After the called function completes execution a return instruction such as ret returns 704 flow to the calling function. S-machine 12 10 reconfigures 705 to the original ISA for the calling function, reads 706 a return value of the called function, and restores live register values 708. The stack parameter passing and return value techniques of FIG. 7 may be implemented in a conventional manner as used in nonreconfigurable computers that do not pass parameters or return values in registers.

The following is an example of code for implementing structured reconfiguration:

```
#pragma func_isa func1 another_isa
int
func1(int *i)
{
...
}
#pragma func_isa main isa0
main()
{
    int foo, bar;
    ...
    bar = func1 (&foo);
}
```

Two functions are shown: main, which uses ISA0, a general purpose instruction set; and func1, which uses another instruction set designated another_isa. The #pragma statements specify the instruction sets for the two functions.

In one embodiment of the present invention employing structured reconfiguration, compiler 402 would compile the function call bar =func1 (&foo) from the above listing into the following assembly code. Comments have been added for illustrative purposes.

```
1   ; make room for return value by decrementing SP
2   eldi 16, a0
3   esub a0, sp
4   ; calculate address of argument foo
5   emov sp, a1
6   eadd a0, a1
7   ; and push it onto the stack
8   estr a1, sp
9   ; reconfig
10  reconfig another_isa
11  ; call the subroutine
12  jsr func1
13  ; get back to isa0
14  reconfig isa0
15  ; clear the pushed parameter
16  eldf d0
17  ; and read the result into register variable bar
18  ldf d0
```

In addition, assembly code for saving and restoring live register values may be added before line 1 and after line 18, respectively.

Referring also to FIGS. 8A, 8B, and 8C, there are shown diagrams of the stack contents at various points in the execution of this assembly code. FIG. 8A shows the condition of stack 800 after execution of lines 1 through 8 of the above-listed assembly code. These lines build the stack frame used by func1. First, room is made to store a return value, then the address of variable foo is pushed onto the stack. Location 801 contains variable foo in stack frame for function main. In this example, variable bar is stored in an ISA0 register and therefore does not appear on stack 800. Location 802 is allocated for a return value, and location 803 contains the address of variable foo.

FIG. 8B shows the condition of stack 800 halfway through the execution of the reconfig instruction at line 10. Referring also to FIG. 6, this stack 800 condition corresponds to the end of step 654, just before the new configuration is to be loaded. The current address of the next instruction (NIPAR) has been pushed onto stack 800 at location 804, and the stack pointer SP has been written to a predetermined address (not shown). At this point, steps 655 though 658 are performed, namely the hardware is reconfigured, the stack pointer is loaded, and NIPAR is popped, as previously described.

FIG. 8C shows the condition of stack 800 upon entry to func1 using the jsr func1 instruction at line 12. Location 804 now contains the return address. When func1 returns, computer 10 reconfigures back to ISA0, the parameter &foo is removed from the stack, and the return value is read into variable bar, which compiler 402 has allocated to register d0.

Executable and Linking Format

The preferred embodiment of the present invention extends standard software development paradigms to include bitstreams defining hardware configurations which specify an FPGA-implemented computer which executes binary machine instructions from executable file 405. This is accomplished by using a new file format designated as ICARUS ELF, comprising an extension of the Executable and Linking Format (ELF) commonly used on Unix workstations and described in UNIX System Laboratories, Inc., *System V Application Binary Interface,* 3d. ed., 1993, which is incorporated herein by reference.

Figure 5:
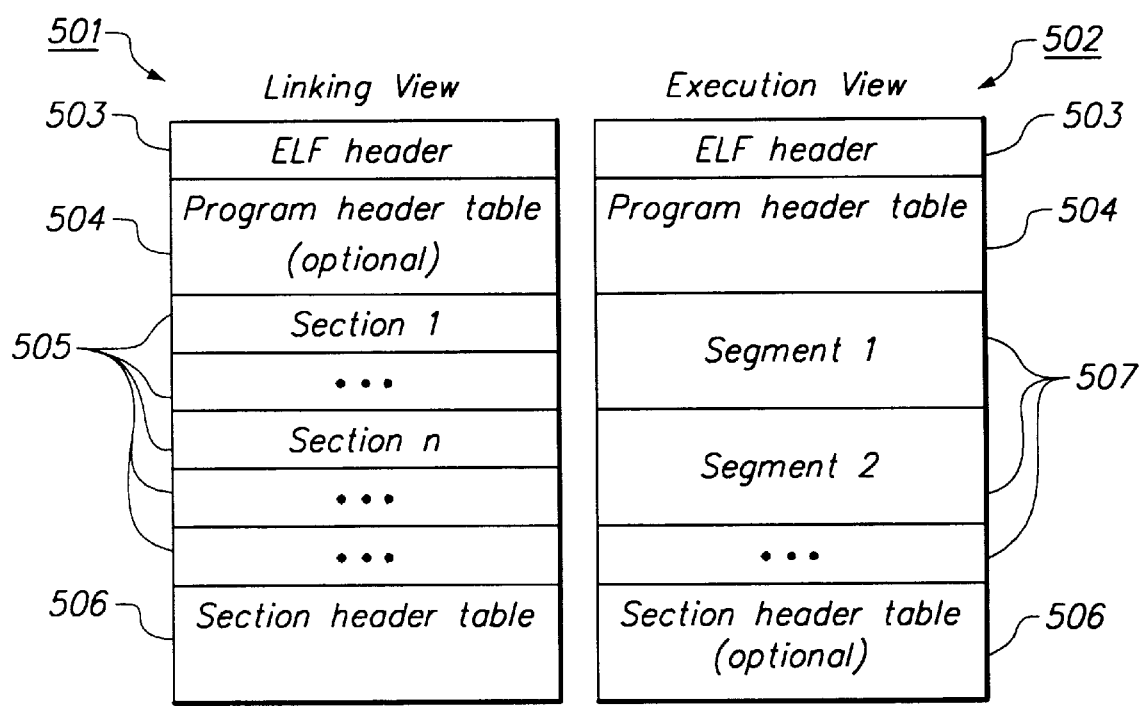
FIG. 5 is a diagram of an object file format according to the prior art.

As described in UNIX System Laboratories, Inc., *System V Application Binary Interface,* 3d. ed., 1993, ELF files are either relocatable files (object files 403) or executable files 405. ELF provides parallel views of the file's contents, reflecting differing needs of these two formats. Referring now to FIG. 5, there is shown a typical ELF file format in a linking view 501 and in an execution view 502 according to the prior art. ELF header 503 holds a "road map" describing the file's organization. Sections 505 hold the bulk of object file information for linking view 501, including instructions, data, symbol table, relocation information, and the like, as will be described in more detail below. Segments 507 used in execution view 502 are analogous to sections 505, with each segment 507 corresponding to one or more sections 505. In addition, segments 507 may include headers that contain information, such as whether the segment 507 is in writable memory, that may or may not be applicable to sections 505. In general, sections 505 contain information used during linking, while segments 507 contain information used during loading.

Program header table 504, if present, tells computer 10 how to build a process image. Section header table 506 contains information describing sections 505. Each section 505 has an entry in table 506; each entry gives information such as section name, size, and the like. Elements shown in FIG. 5 can be provided in any order, and some elements may be omitted.

Further details regarding the elements shown in FIG. 5 can be found in UNIX System Laboratories, Inc., *System V Application Binary Interface,* 3d. ed., 1993. The following description explains the differences between standard ELF as described in *System V Application Binary Interface* and the ICARUS ELF file format used in the present invention.

The ICARUS ELF file format uses processor-dependent features of ELF to provide relocation of bitstream addresses used within program text, and to provide relocation and linking of bitstreams into segments that can be loaded at run-time within dedicated bitstream memory 132. ICARUS ELF thus extends standard ELF to facilitate storage of bitstreams defining FPGA configurations along with the executable code that runs on the FPGA-defined hardware.

ICARUS ELF adds to standard ELF by providing new data types, sections, symbol types, and relocation types for ISA bitstreams.

Data Types. In the preferred embodiment, the reconfigurable computer uses 64-bit wide bit addresses. Addresses point to the bit offset of the least significant bit of the data item. ICARUS ELF is designed for 64-bit byte addresses, where the address points to the first byte (least significant for little endian processors, most significant for big endian processors) of each data item. Thus, while offsets in headers are defined in terms of bytes, addresses to be relocated are specified at 64-bit bit addresses. This permits use of a linker on a byte-oriented computer. ICARUS ELF employs two new data types to facilitate 64-bit addressing:

ICARUS_ELF_Addr: size 8 bytes, with alignment that is determined by $K_{isa}$ for the current ISA, which represents the base-2 logarithm of the bit-width of the memory (e.g. 3 for 8-bit, 4 for 16-bit).

ICARUS_ELF_Off: byte offset into the file, size 4 bytes, alignment 1 byte.

Sections. One embodiment of the present invention adds a new section containing FPGA bitstream data, with the name .ICARUS.bitstream. One or more such sections may be provided. In the preferred embodiment, each such section is of ELF section type SHT_PROGBITS and has ELF section attribute SHF_ALLOC. SHT_PROGBITS designates a section holding information defined by the program, whose format and meaning are determined solely by the program. Attribute SHF_ALLOC specifies that the section occupies memory during process execution, information that may be useful to the loader.

Since ELF allows multiple instances of a section with a particular name, the present invention can employ one section per bitstream, or alternatively it can merge all bitstreams into one section with proper alignment.

It is advantageous to provide a new section for bitstreams so that hardware can be built with special memory areas for bitstreams. The separate section facilitates placement of bitstreams in these special memory areas by the loader. If such memory areas are not needed, the present invention can be implemented using a standard data section for program read-only data, such as .rodata and .rodata1, as described in *System V Application Binary Interface*, rather than introducing special bitstream sections.

Symbols. Object files contain symbol tables holding information for locating and relocating a program's symbolic definitions and references. In one embodiment of the present invention, each bitstream contained in the .ICARUS- .bitstream section has an entry in the symbol table of the object file. In the linking view 501 of FIG. 5, the symbol table is located in a separate section 505. The symbol has the following attributes:

st_name: The symbol's name is the name used to reference it in the assembly language source for the object file. st_name holds an index into the object file's symbol string table, which holds the character representations of the symbol names.

st_value: For bitstream symbols, provides the offset of the bitstream within the section.

st_size: Size in bits of the bitstream.

st_info: Specifies type and binding attributes. A new type is employed, denoted as STT_BITSTREAM. This new type is specific to the present invention and signifies that this symbol is an FPGA bitstream. Binding determines linkage visibility and behavior and can be STB_LOCAL or STB_GLOBAL. STB_LOCAL indicates that the symbol is not visible outside the object file containing the symbol's definition. STB_GLOBAL indicates that the symbol is visible to all object files being combined. For bitstream symbols, binding may be either STB_LOCAL or STB_GLOBAL. Since bitstreams are usually used by more than one code section, and may therefore be compiled into a library for reuse, STB_GLOBAL is more likely to be used.

Relocations. Relocation is the process of connecting symbolic references with symbolic definitions. Relocatable files contain relocations, which are data describing where specific symbolic definitions may be found so that the linker may locate them. Specific relocation operations vary from ISA to ISA, just as with standard ELF files. Relocation types are contained within r_info fields of ICARUS_ELF_REL and ICARUS_ELF_RELA structures. Examples of such relocation types include:

ICARUS_64_BIT_ADDR: 64-bit addresses determined at assembly time. Typically loaded into the processor with the eldi instruction.

ICARUS_64_BIT_OFFSET: Relative address offsets from current NIPAR location to a symbol, typically a label. Used by the br (branch) instructions.

Therefore, in accordance with the invention as claimed herein, the above-described ICARUS ELF object file format makes novel use of software linking technology to encapsulate computer programs along with the hardware configuration on which the program runs, using a reconfigurable computer 10 as described above. The system and method of the present invention can perform compilation for multiple ISAs within a single source file, and in one embodiment is capable of encapsulating machine instructions and data along with hardware configurations required to execute the machine instructions.

What is claimed is:

1. A compiling method for generating a sequence of program instructions for use in a dynamically reconfigurable processing unit having an internal hardware organization that is selectively changeable during execution of the sequence of program instructions among a plurality of hardware architectures, each hardware architecture executing instructions from a corresponding instruction set, the compiling method comprising:

a) accepting as input a source file containing a plurality of source code instruction statements including at least a first subset of instruction statements and a second subset of instruction statements;

b) identifying a first instruction set for the first subset of instruction statements by retrieving a first reconfiguration directive from the source code, the reconfiguration directive specifying the first instruction set;

c) identifying a second instruction set for the second subset of instruction statements by retrieving a second reconfiguration directive from the source code, the reconfiguration directive specifying the second instruction set; and d) compiling the first subset of instruction statements for execution using the first instruction set and compiling the second subset of instruction statements for execution using the second instruction set;

wherein each of the reconfiguration directive specifies a change in hardware organization to occur during program execution.

2. The method of claim 1, wherein each reconfiguration directive is provided using a meta-syntax.

3. The method of claim 1, wherein each reconfiguration directive comprises one of an immediate reconfiguration directive, a function-level reconfiguration directive, and a default reconfiguration directive.

4. The method of claim 1, further comprising:

e) generating an executable file including the results of d) and further including, for each subset of instruction statements, a reconfiguration code identifying the instruction set corresponding to the subset of instruction statements.

5. The method of claim 1, further comprising:

e) generating an executable file including the results of d) and further including, for each subset of instruction statements, a reference designating a bitstream representing the instruction set corresponding to the subset of instruction statements.

6. The method of claim 1, further comprising:

e) generating an executable file including the results of d) and further including, for each subset of instruction statements, a reference encoded according to an extended executable and linking format, the reference designating a bitstream representing the instruction set corresponding to the subset of instruction statements.

7. The method of claim 1, further comprising:
e) generating an executable file including the results of d) and further including, for each subset of instruction statements, a bitstream representing the instruction set corresponding to the subset of instruction statements.

8. The method of claim 1, further comprising:
e) generating a first object file including the results of d) and further including, for each subset of instruction statements, a reconfiguration code identifying the instruction set corresponding to the subset of instruction statements;
f) repeating a) through e) for at least a second source file to generate at least a second object file; and
g) linking the object files generated in e) and f) to generate an executable file.

9. The method of claim 8, further comprising:
h) performing memory alignment on the generated executable file according to alignment requirements.

10. The method of claim 9, wherein the generated executable file is associated with a bitstream representing an instruction set, and wherein h) comprises:
h.1) padding the bitstream to perform memory alignment.

11. The method of claim 8, wherein:
a) comprises accepting as input a source file containing a plurality of source code instruction statements including at least a first subset of instruction statements and a second subset of instruction statements, wherein at least one of the instruction statements contains an external reference; and
e) comprises generating a first object file including the results of d) and further including, for each subset of instruction statements, a reconfiguration code identifying the instruction set corresponding to the subset of instruction statements, wherein at least one of the instruction statements contains an external reference; and further comprising:
f.1) prior to g), resolving the external references of each object file.

12. The method of claim 1, wherein the first subset of instruction statements comprises a first defined function and the second subset of instruction statements comprises a second defined function.

13. The method of claim 1, wherein the first subset of instruction statements comprises a first arbitrary block of statements and the second subset of instruction statements comprises a second arbitrary block of statements.

14. The method of claim 13, wherein the source file includes at least one function call and function return, and wherein steps b) and c) each comprise selectively performing inter-procedural analysis to identify an incontext instruction set architecture at each function call and function return.

15. The method of claim 1, further comprising:
e) optimizing the first compiled subset of instruction statements for the first instruction set; and
f) optimizing the second compiled subset of instruction statements for the second instruction set.

16. A compiling method for generating a sequence of program instructions for use in a dynamically reconfigurable processing unit having an internal hardware organization that is selectively changeable during execution of the sequence of program instructions among a plurality of hardware architectures, each hardware architecture executing instructions from a corresponding instruction set, the compiling method comprising:
a) selecting a source code instruction statement from a source file containing a plurality of source code instruction statements;
b) responsive to the statement comprising a function call, performing the steps of:
b.1) determining a first instruction set currently in context;
b.2) determining a second instruction set for the function call;
b.3) responsive to the first instruction set being different than the second instruction set, performing the steps of:
b.3.1) emitting code statements for reconfiguration to the second instruction set;
b.3.2) emitting a compiled code statement for the function call; and
b.3.3) emitting code statements for reconfiguration to the first instruction set; and
b.4) responsive to the first instruction set architecture being identical to the second instruction set, emitting a compiled code statement for the function call;
c) responsive to the statement not comprising a function call, emitting a compiled code statement for the statement; and
d) repeating a) through c) for each source code instruction statement in the source file.

17. The method of claim 16, wherein b.3.1) comprises:
b.3.1.1) emitting a code statement for saving live registers; and
b.3.1.2) emitting a reconfiguration code statement;
and b.3.3) comprises:
b.3.3.1) emitting a reconfiguration code statement; and
b.3.3.2) emitting a code statement for restoring the saved live registers.

18. The method of claim 17, wherein the code statements comprise register transfer level statements.

19. The method of claim 18, further comprising:
e) performing register allocation;
f) for each register transfer level statement:
f.1) determining whether a translation rule exists for the register transfer level statement; and
f.2) responsive to a determination that a translation rule exists, generating assembly code for the register transfer level statement according to the translation rule.

20. The method of claim 18, further comprising:
e) annotating each register transfer level statement to indicate an instruction set architecture;
f) optimizing the register transfer level statements; and
g) generating machine-depending assembly code from the optimized register transfer level statements.

21. A method of reconfiguring a dynamically reconfigurable processing unit during execution of a program comprising a sequence of program instructions, the method comprising:
a) identifying a reconfiguration directive from the source code, the reconfiguration directive specifying a new instruction set;
b) storing a state of the program execution;
c) loading the new instruction set;
d) retrieving at least a portion of the stored state of the program execution; and
e) resuming execution using the new instruction set;
wherein the reconfiguration directive specifies a change in hardware organization to occur during program execution.

22. The method of claim 21 wherein b) comprises:
b.1) storing state variables on a stack referenced by a stack pointer; and
b.2) storing the stack pointer in a memory location; and
d) comprises:
d.1) retrieving the stack pointer from the memory location; and
d.2) retrieving the state variables from the stack.

23. A compiling system for generating a sequence of program instructions for use in a dynamically reconfigurable processing unit having an internal hardware organization that is selectively changeable during execution of the sequence of program instructions among a plurality of hardware architectures, each hardware architecture executing instructions from a corresponding instruction set, the compiling system comprising:
an input device for inputting at least one source file containing a plurality of source code instruction statements, including at least a first subset of instruction statements, a second subset of instruction statements, and, for each subset of instruction statements a reconfiguration directive specifying one of the hardware architectures, each of the reconfiguration directives specifying a change in hardware organization to occur during program execution; and
a compiler, coupled to receive each source file from the input device, for compiling each input source file to produce an object file by identifying the instruction set corresponding to the hardware architecture specified by each reconfiguration directive, compiling at least a portion of the input source file for execution using each identified instruction set, and generating a reconfiguration code corresponding to each reconfiguration directive.

24. The compiling system of claim 23, further comprising:
a linker, coupled to receive each object file, for combining the object files to generate an executable file containing, for each reconfiguration directive, a reference to a bitstream describing the hardware architecture specified by the reconfiguration directive and a sequence of program instructions for the described hardware architecture.

25. The compiling system of claim 23, further comprising:
a linker, coupled to receive each object file, for combining the object files to generate an executable file containing, for each reconfiguration directive, a bitstream describing the hardware architecture specified by the reconfiguration directive and a sequence of program instructions for the described hardware architecture.

26. A computer program product comprising a computer-usable medium having computer-readable code embodied therein for generating a sequence of program instructions for use in a dynamically reconfigurable processing unit, comprising:
computer-readable program code devices configured to accept as input a source file containing a plurality of source code instruction statements including at least a first subset of instruction statements and a second subset of instruction statements;
computer-readable program code devices configured to identify a first instruction set for the first subset of instruction statements by retrieving a first reconfiguration directive from the source code, the reconfiguration directive specifying the first instruction set;
computer-readable program code devices configured to identify a second instruction set for the second subset of instruction statements by retrieving a second reconfiguration directive from the source code, the reconfiguration directive specifying the second instruction set; and
computer-readable program code devices configured to compile the first subset of instruction statements for execution using the first instruction set and compiling the second subset of instruction statements for execution using the second instruction set,
wherein each of the reconfiguration directives specifies a change in hardware organization to occur during program execution.

27. The computer program product of claim 26, further comprising:
computer-readable program code devices configured to generate an executable file including the compiled statements and further including, for each subset of instruction statements, a reconfiguration code identifying the instruction set corresponding to the subset of instruction statements.

28. The computer program product of claim 26, further comprising:
computer-readable program code devices configured to generate an executable file including the compiled statements and further including, for each subset of instruction statements, a reference designating a bitstream representing the instruction set corresponding to the subset of instruction statements.

29. The computer program product of claim 26, further comprising:
computer-readable program code devices configured to generate an executable file including the compiled statements and further including, for each subset of instruction statements, a reference encoded according to an extended executable and linking format, the reference designating a bitstream representing the instruction set corresponding to the subset of instruction statements.

30. The computer program product of claim 26, further comprising:
computer-readable program code devices configured to generate an executable file including the compiled statements and further including, for each subset of instruction statements, a bitstream representing the instruction set corresponding to the subset of instruction statements.

31. The computer program product of claim 26, further comprising:
computer-readable program code devices configured to generate a first object file including the compiled statements and further including, for each subset of instruction statements, a reconfiguration code identifying the instruction set corresponding to the subset of instruction statements;
computer-readable program code devices configured to generate at least a second object file; and
computer-readable program code devices configured to link the generated object files generated to generate an executable file.

32. The computer program product of claim 31, further comprising:
computer-readable program code devices configured to perform memory alignment on the generated executable file according to alignment requirements.

* * * * *

UNITED STATES PATENT AND TRADEMARK OFFICE
CERTIFICATE OF CORRECTION

PATENT NO. : 5,933,642

DATED : August 3, 1999

INVENTOR(S) : Jack E. Greenbaum and Michael A. Baxter

It is certified that error appears in the above-identified patent and that said Letters Patent is hereby corrected as shown below:

In claim 1, column 20, line 39, please delete "directive" and insert --directives--.

Signed and Sealed this

Tenth Day of April, 2001

*Attest:*

NICHOLAS P. GODICI

*Attesting Officer*   *Acting Director of the United States Patent and Trademark Office*